(12) United States Patent
Ito et al.

(10) Patent No.: US 11,823,063 B2
(45) Date of Patent: Nov. 21, 2023

(54) DISTRIBUTED PROCESSING SYSTEM AND DISTRIBUTED PROCESSING METHOD

(71) Applicant: Nippon Telegraph and Telephone Corporation, Tokyo (JP)

(72) Inventors: Tsuyoshi Ito, Tokyo (JP); Kenji Kawai, Tokyo (JP); Junichi Kato, Tokyo (JP); Huycu Ngo, Tokyo (JP); Yuki Arikawa, Tokyo (JP); Takeshi Sakamoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 560 days.

(21) Appl. No.: 16/973,707

(22) PCT Filed: May 21, 2019

(86) PCT No.: PCT/JP2019/020107
§ 371 (c)(1),
(2) Date: Dec. 9, 2020

(87) PCT Pub. No.: WO2019/239821
PCT Pub. Date: Dec. 19, 2019

(65) Prior Publication Data
US 2021/0216866 A1 Jul. 15, 2021

(30) Foreign Application Priority Data
Jun. 15, 2018 (JP) ................................. 2018-114349

(51) Int. Cl.
*G06N 3/098* (2023.01)
*G06N 3/04* (2023.01)
(Continued)

(52) U.S. Cl.
CPC ............... *G06N 3/098* (2023.01); *G06N 3/04* (2013.01); *G06N 3/08* (2013.01); *H04L 47/41* (2013.01)

(58) Field of Classification Search
None
See application file for complete search history.

(56) References Cited

PUBLICATIONS

Dean J, Corrado G, Monga R, Chen K, Devin M, Mao M, Ranzato MA, Senior A, Tucker P, Yang K, Le Q. Large scale distributed deep networks. Advances in neural information processing systems. 2012;25.) (Year: 2012) .*

(Continued)

*Primary Examiner* — Vincent Gonzales
(74) *Attorney, Agent, or Firm* — Slater Matsil, LLP

(57) ABSTRACT

Individual distributed processing nodes packetize distributed data for each weight of a neural network of a learning object in an order of a number of the weight, transmit the distributed data to an aggregation processing node, acquire aggregation data transmitted from the node in order, and update the weight of the neural network. The node acquires the transmitted distributed data, packetizes the aggregation data for which the distributed data of all the distributed processing nodes is aggregated for each weight, and transmits the aggregation data to the individual nodes. The individual nodes monitor an unreceived data amount which is a difference between data amounts of the transmitted distributed data and the acquired aggregation data, and when the unreceived data amount becomes equal to or larger than a threshold Ma, stops transmission of the distributed data until the unreceived data amount becomes equal to or smaller than a threshold Mb (Mb<Ma).

10 Claims, 16 Drawing Sheets

(51) Int. Cl.
*H04L 47/41* (2022.01)
*G06N 3/08* (2023.01)

(56) References Cited

PUBLICATIONS

Li M, Andersen DG, Park JW, Smola AJ, Ahmed A, Josifovski V, Long J, Shekita EJ, Su BY. Scaling distributed machine learning with the parameter server. In 11th USENIX Symposium on operating systems design and implementation (OSDI 14) 2014 (pp. 583-598). (Year: 2014).*

Akiba, T., et al., "Distributed Deep Learning Package ChainerMNPublished," Distributed Deep Learning Package ChainerMN Public, May 9, 2017, 5 pages.

* cited by examiner

DISTRIBUTED PROCESSING SYSTEM AND DISTRIBUTED PROCESSING METHOD

This patent application is a national phase filing under section 371 of PCT/JP2019/020107, filed May 21, 2019, which claims the priority of Japanese patent application number 2018-114349, filed Jun. 15, 2018, each of which is incorporated herein by reference in its entirety.

TECHNICAL FIELD

The present invention relates to a distributed processing system and a distributed processing method that perform learning of a neural network by linking an aggregation processing node and a plurality of distributed processing nodes.

BACKGROUND

In deep learning, for a learning object composed of multilayered neuron models, by updating a weight (a coefficient to be multiplied with a value outputted by a neuron model of a preceding stage) of each neuron model based on inputted sample data, inference accuracy is improved.

Typically, for a method to improve the inference accuracy, a mini batch method is used. In the mini batch method, gradient calculation processing of calculating a gradient to the weight for each piece of sample data, aggregation processing of aggregating the gradient for the plurality of pieces of different sample data (adding up the gradients obtained for each piece of sample data for each weight), and weight updating processing of updating each weight based on the aggregated gradients are repeated.

The processing, the gradient calculation processing in particular, requires multiple operations, and there is a problem that time needed for the deep learning increases when the number of weights and the number of pieces of sample data to be inputted are increased in order to improve the inference accuracy.

A method of distributed processing is used to accelerate the gradient calculation processing. Specifically, a plurality of distributed processing nodes are provided, and each node performs the gradient calculation processing for different sample data respectively. Thus, the number of pieces of sample data that can be processed in unit time can be increased in proportion to the number of nodes so that the gradient calculation processing can be accelerated (see Non-Patent Literature 1).

In the distributed processing of the deep learning, in order to perform the aggregation processing, communication (integration communication) from each distributed processing node to the aggregation processing node for integrating data (distributed data) obtained for each distributed processing node to the aggregation processing node, entire node aggregation processing in the aggregation processing node, and communication (distribution communication) from the aggregation processing node to the distributed processing nodes for transferring data (aggregation data) aggregated by the aggregation processing node to each distributed processing node are required.

FIG. 15 illustrates a sequence of the distributed processing of the deep learning by conventional technology. A distributed processing node 100[$n$] ($n=1, \ldots, N$) performs sample data input, the gradient calculation processing and intra-node aggregation processing in a period I, and transmits distributed data to an aggregation processing node 101.

In a period II, such transmission from each node is performed, but each node does not always transmit the distributed data simultaneously.

In a period III, the aggregation processing node 101 performs the entire node aggregation processing of adding up the gradients obtained from each node for each weight, and aggregation data is transmitted to each distributed processing node 100[$n$] in a period IV. In a period V, each distributed processing node 100[$n$] performs weight updating processing.

Since the distributed processing is performed in this way, each processing time of the integration communication (II), the entire node aggregation processing (III) and the distribution communication (IV) is added to the deep learning.

Such processing time is unnecessary in a system that executes the deep learning by a single node, and causes decline of a processing speed when performing the distributed processing of the deep learning.

In recent years, the deep learning is being applied to more complicated problems, and a total number of weights tends to increase. Therefore, a data amount of the distributed data and the aggregation data increases, and integration communication time and distribution communication time increase. In addition, due to increase of the integration communication time and the distribution communication time, data processing loads in the aggregation processing node and the distributed processing nodes also increase.

In this way, a distributed system of the deep learning has a problem that an effect of acceleration of the deep learning is lowered by increasing the number of the individual distributed processing nodes due to the increase of the integration communication time and the distribution communication time and the increase of the data processing loads in the aggregation processing node and the distributed processing nodes. FIG. 16 illustrates a relation between the number of the distributed processing nodes and processing performance of the deep learning in a conventional distributed processing system, an ideal relation between the number of the distributed processing nodes and the processing performance (the performance ∝ the number of the nodes) is denoted by 200, and an actual relation between the number of the distributed processing nodes and the processing performance is denoted by 201.

CITATION LIST

Non-Patent Literature

Non-Patent Literature 1: Takuya Akiba, "Distributed deep learning package ChainerMN Release", Preferred Infrastructure, 2017, Internet <https://research.preferred.jp/2017/05/chainermn-beta-release/>

SUMMARY

Technical Problem

Embodiments of the present invention are implemented in consideration of above-described circumstances, and an object is to provide, in a distributed processing system including an aggregation processing node and a plurality of distributed processing nodes, a distributed processing system and a distributed processing method capable of improving learning efficiency of a neural network, also reducing processing loads of nodes, and efficiently and stably performing an operation.

Means for Solving the Problem

A distributed processing system of embodiments of the present invention includes an aggregation processing node and N (N is an integer equal to or larger than 2) distributed processing nodes, in which each distributed processing node packetizes distributed data D[m, n] (n=1, . . . , N) for each of M (M is an integer equal to or larger than 2) weights w[m] (m=1, . . . , M) of a neural network of a learning object in an order of a number m of the weight w[m], transmits the data to the aggregation processing node, receives a packet transmitted from the aggregation processing node, acquires aggregation data R[m] in the order of the number m, and updates the weight w[m] of the neural network based on the aggregation data R[m], the aggregation processing node receives a packet transmitted from each distributed processing node, acquires the distributed data D[m, n] in the order of the number m, generates the aggregation data R[m] for which the distributed data D[m, n] of all the distributed processing nodes is aggregated for each weight w[m], packetizes the aggregation data R[m] in the order of the number m, and transmits the data to each distributed processing node, and each distributed processing node monitors an unreceived data amount which is a difference between a data amount of transmitted distributed data D[m, n] and a data amount of acquired aggregation data R[m] in a period from start of transmission of the distributed data D[m, n] to the aggregation processing node until end of acquisition of M pieces of the aggregation data R[m], and when the unreceived data amount becomes equal to or larger than a threshold Ma, stops the transmission of the distributed data D[m, n] until the unreceived data amount becomes equal to or smaller than a threshold Mb (Mb<Ma).

In addition, in one configuration example of the distributed processing system of embodiments of the present invention, each distributed processing node includes: a transmission unit configured to packetize the distributed data D[m, n] in the order of the number m and transmit the data to the aggregation processing node; a reception unit configured to receive a packet transmitted from the aggregation processing node and acquire the aggregation data R[m] in the order of the number m; a weight updating processing unit configured to update the weight w[m] of the neural network based on the aggregation data R[m]; a transmission count unit configured to count a number Mt (Mt is a positive integer equal to or smaller than M) of pieces of the transmitted distributed data D[m, n] in the period from the start of the transmission of the distributed data D[m, n] to the aggregation processing node until the end of the acquisition of M pieces of the aggregation data R[m]; a reception count unit configured to count a number Mr (Mr is a positive integer equal to or smaller than M) of pieces of the acquired aggregation data R[m] in the period from the start of the transmission of the distributed data D[m, n] to the aggregation processing node until the end of the acquisition of M pieces of the aggregation data R[m]; and a transmission control unit configured to, when the unreceived data amount which is a difference between the numbers Mt and Mr becomes equal to or larger than the threshold Ma (Ma is a positive integer smaller than M), stop the transmission of the distributed data D[m, n] by the transmission unit until the unreceived data amount becomes equal to or smaller than the threshold Mb (Mb is a positive integer smaller than Ma).

Furthermore, in one configuration example of the distributed processing system of embodiments of the present invention, the aggregation processing node comprises: a reception unit configured to receive the packet transmitted from each distributed processing node and acquire the distributed data D[m, n] in the order of the number m; an aggregation processing unit configured to generate the aggregation data R[m] for which the distributed data D[m, n] of all the distributed processing nodes is aggregated for each weight w[m]; and a transmission unit configured to packetize the aggregation data R[m] in the order of the number m and transmit the data to each distributed processing node.

In addition, in one configuration example of the distributed processing system of embodiments of the present invention, each distributed processing node further comprises: a gradient calculation processing unit configured to, when sample data for learning of the neural network is inputted, calculate a gradient of a loss function of the neural network for each piece of the sample data, for each of the weights w[m] of the neural network; and an intra-node aggregation processing unit configured to generate and hold the distributed data D[m, n] that is a numerical value for which the gradient for each piece of sample data is aggregated, for each weight w[m].

Also, in one configuration example of the distributed processing system of embodiments of the present invention, the aggregation processing node and each distributed processing node perform integration communication processing in which each distributed processing node transmits the packetized distributed data D[m, n] to the aggregation processing node and the aggregation processing node acquires the distributed data D[m, n] from the received packet, entire node aggregation processing in which the aggregation processing node generates the aggregation data R[m], distribution communication processing in which the aggregation processing node transmits the packetized aggregation data R[m] to each distributed processing node and each distributed processing node acquires the aggregation data R[m] from the received packet, and weight updating processing in which each distributed processing node updates the weight w[m], in parallel for the respectively different numbers m.

Further, a distributed processing method of embodiments of the present invention includes: a first step in which each of N (N is an integer equal to or larger than 2) distributed processing nodes packetizes distributed data D[m, n] (n=1, . . . , N) for each of M (M is an integer equal to or larger than 2) weights w[m] (m=1, . . . , M) of a neural network of a learning object in an order of a number m of the weight w[m], and transmits the data to an aggregation processing node; a second step in which the aggregation processing node receives a packet transmitted from each distributed processing node, and acquires the distributed data D[m, n] in the order of the number m; a third step in which the aggregation processing node generates aggregation data R[m] for which the distributed data D[m, n] of all the distributed processing nodes is aggregated for each weight w[m]; a fourth step in which the aggregation processing node packetizes the aggregation data R[m] in the order of the number m, and transmits the data to each distributed processing node; a fifth step in which each of the distributed processing nodes receives a packet transmitted from the aggregation processing node, and acquires the aggregation data R[m] in the order of the number m; a sixth step in which each of the distributed processing nodes updates the weight w[m] of the neural network based on the aggregation data R[m]; and a seventh step in which each of the distributed processing nodes monitors an unreceived data amount which is a difference between a data amount of transmitted distributed data D[m, n] and a data amount of acquired aggregation data R[m] in a period from start of transmission of the distributed data D[m, n] to the aggregation processing node until end of acquisition of M pieces of the aggregation data R[m], and when the unreceived data amount becomes equal to or larger than a threshold Ma, stops the transmission of the distributed data D [m, n] by the first step until the unreceived data amount becomes equal to or smaller than a threshold Mb (Mb<Ma).

In addition, one configuration example of the distributed processing method of embodiments of the present invention further includes: an eighth step in which, when sample data for learning of the neural network is inputted, each of the distributed processing nodes calculates a gradient of a loss function of the neural network for each piece of the sample data, for each of the weights w[m] of the neural network, before the first step; and a ninth step in which each of the distributed processing nodes generates and holds the distributed data D[m, n] that is a numerical value for which the gradient for each piece of sample data is aggregated, for each weight w[m].

Furthermore, in one configuration example of the distributed processing method of embodiments of the present invention, the first step of the distributed processing node and the second step of the aggregation processing node, the third step of the aggregation processing node, the fourth step of the aggregation processing node and the fifth step of the distributed processing node, and the sixth step of the distributed processing node are performed in parallel for the respectively different numbers m.

Effects of Embodiments of the Invention

According to embodiments of the present invention, since each distributed processing node packetizes distributed data for each weight of a neural network in order, transmits the data to an aggregation processing node, acquires aggregation data stored in a packet transmitted from the aggregation processing node in order and updates the weight of the neural network, and the aggregation processing node acquires the distributed data stored in the packet transmitted from each distributed processing node in order, packetizes the aggregation data for which the distributed data of all the distributed processing nodes is aggregated and transmits the data to each distributed processing node, processing of transmitting the distributed data from each distributed processing node to the aggregation processing node and processing of transmitting the aggregation data from the aggregation processing node to each distributed processing node can be simultaneously performed, effective distributed processing can be performed and thus, learning efficiency of the neural network can be improved. Further, in embodiments of the present invention, since each distributed processing node monitors an unreceived data amount which is a difference between a data amount of transmitted distributed data and a data amount of acquired aggregation data, and when the unreceived data amount becomes equal to or larger than a threshold Ma, stops transmission of the distributed data until the unreceived data amount becomes equal to or smaller than a threshold Mb, transient processing loads to the aggregation processing node can be distributed by suppressing transient distributed data concentration on the aggregation processing node, effective and further stable distributed processing can be performed and thus, the learning efficiency and stability of the neural network can be improved.

DETAILED DESCRIPTION OF ILLUSTRATIVE EMBODIMENTS

First Embodiment

Figure 1:
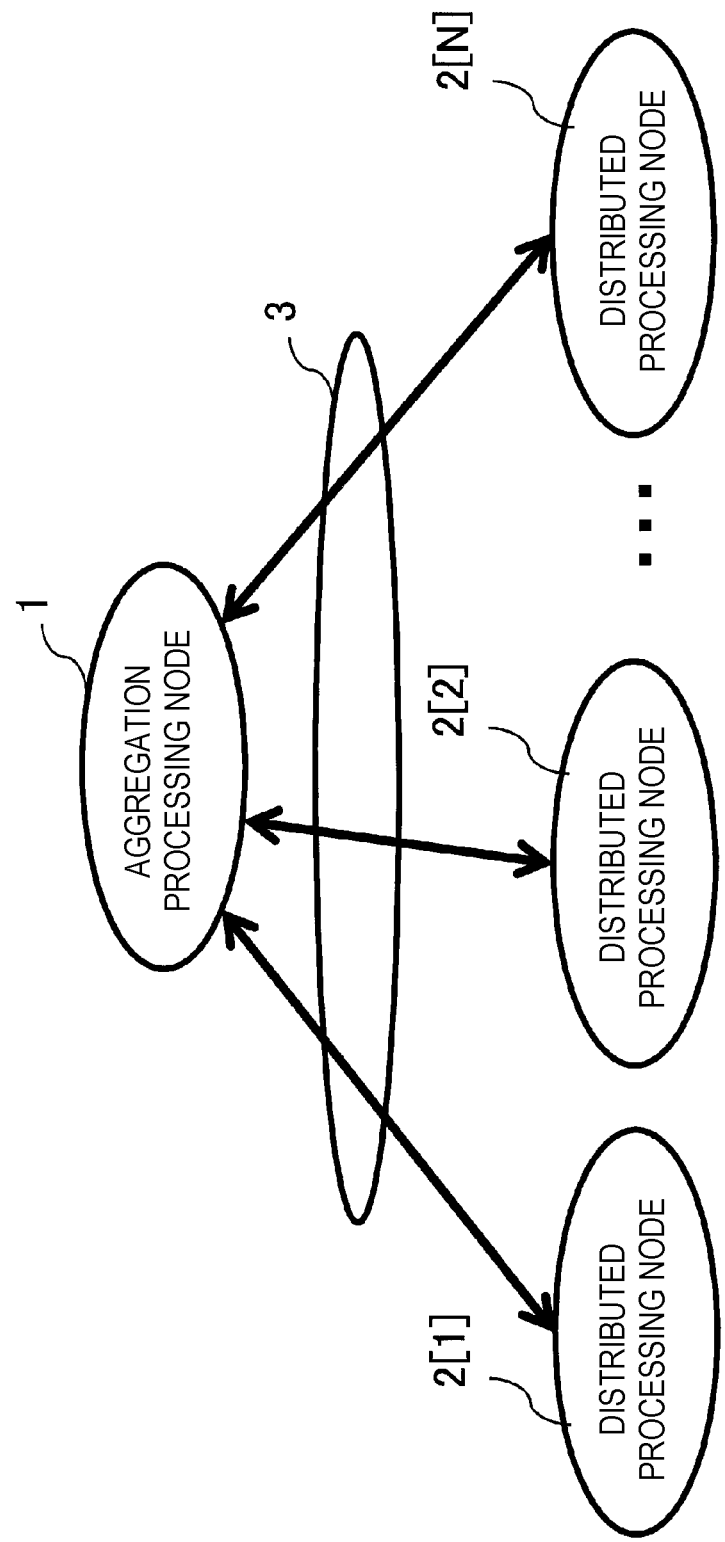
FIG. 1 is a block diagram illustrating a configuration example of a distributed processing system for deep learning according to a first embodiment of the present invention.

Hereinafter, an embodiment of the present invention will be described with reference to drawings. FIG. 1 is a block diagram illustrating a configuration example of a distributed processing system for deep learning according to the first embodiment of the present invention. The distributed processing system in FIG. 1 includes one aggregation processing node 1, and N (N is an integer equal to or larger than 2) distributed processing nodes 2[n] (n=1, ..., N) provided for each set of sample data (learning data) of a neural network. Each distributed processing node 2[n] is connected with the aggregation processing node 1 by a network 3 capable of bidirectional communication.

Note that, in embodiments of the present invention, "node" means a device such as a server distributed and arranged on the network. In addition, while the network 3 is described as a one-to-many connection configuration for which the distributed processing nodes 2[n] are connected in a tree shape with the aggregation processing node 1 at a top, it is needless to say that the network 3 is not limited to a tree structure in particular, and may be the network of any configuration as long as the aggregation processing node 1 and the distributed processing nodes 2[n] can either directly or indirectly perform bidirectional communication.

Figure 2:
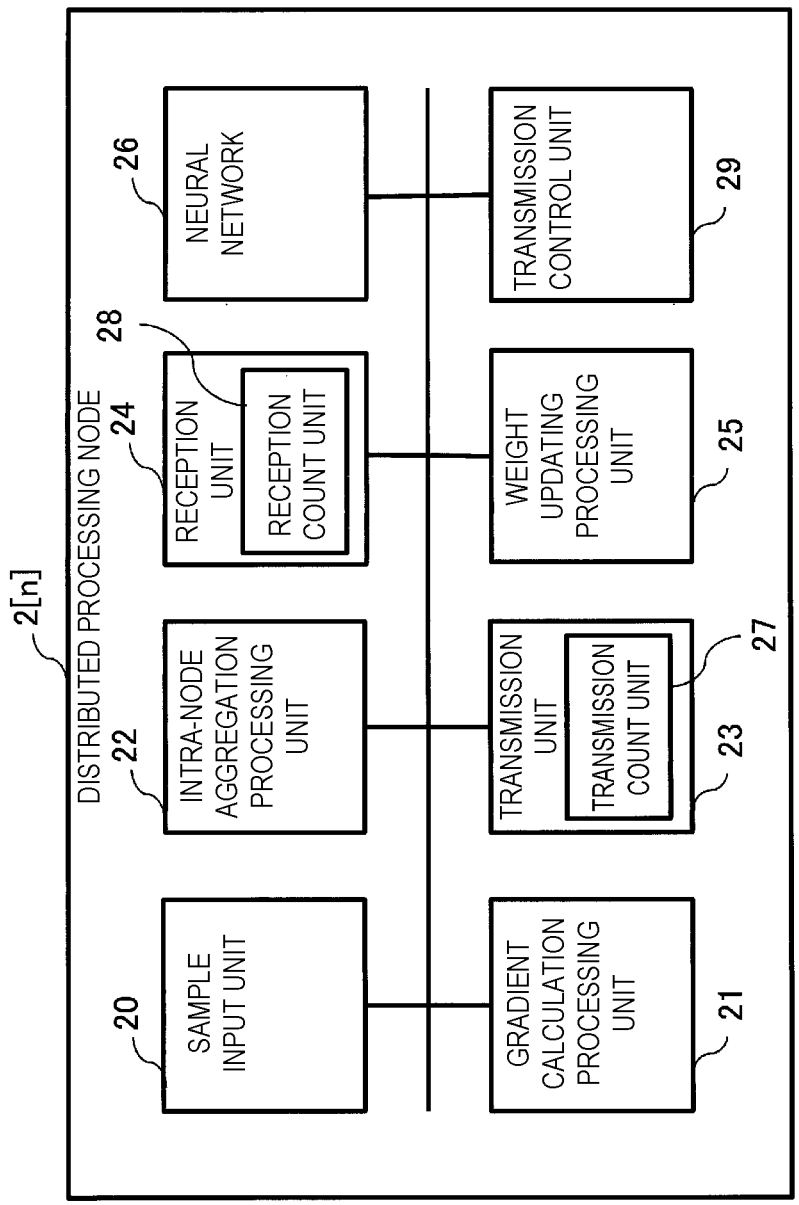
FIG. 2 is a block diagram illustrating a configuration example of a distributed processing node of the distributed processing system for the deep learning according to the first embodiment of the present invention.

FIG. 2 is a block diagram illustrating a configuration example of the distributed processing node 2[n]. Each distributed processing node 2[n] includes: a sample input unit 20 that receives sample data for learning from a data collection node not illustrated respectively; a gradient calculation processing unit 21 that calculates a gradient of a loss function of a neural network for each piece of the sample data, for each of weights of the neural network when the sample data is inputted; an intra-node aggregation processing unit 22 that generates and holds distributed data that is a numerical value for which the gradient for each piece of the sample data is aggregated, for each weight; a transmission unit 23 that packetizes the distributed data and transmits the data to the aggregation processing node 1; a reception unit 24 that receives a packet transmitted from the aggregation processing node 1 and acquires aggregation data; a weight updating processing unit 25 that updates the weight of the neural network based on the aggregation data; a neural network 26 which is a mathematic model constructed by software; a transmission count unit 27 that is included in the transmission unit 23 and counts a data amount (the number of pieces) of transmitted distributed data in the transmission unit 23; a reception count unit 28 that is included in the reception unit 24 and counts a data amount (the number of pieces) of acquired aggregation data in the reception unit 24; and a transmission control unit 29 that monitors an unreceived data amount which is a difference between the data amount of the transmitted distributed data and the data amount of the acquired aggregation data, and when the unreceived data amount becomes equal to or larger than a threshold Ma, stops transmission of the distributed data until the unreceived data amount becomes equal to or smaller than a threshold Mb (Mb<Ma).

Figure 3:
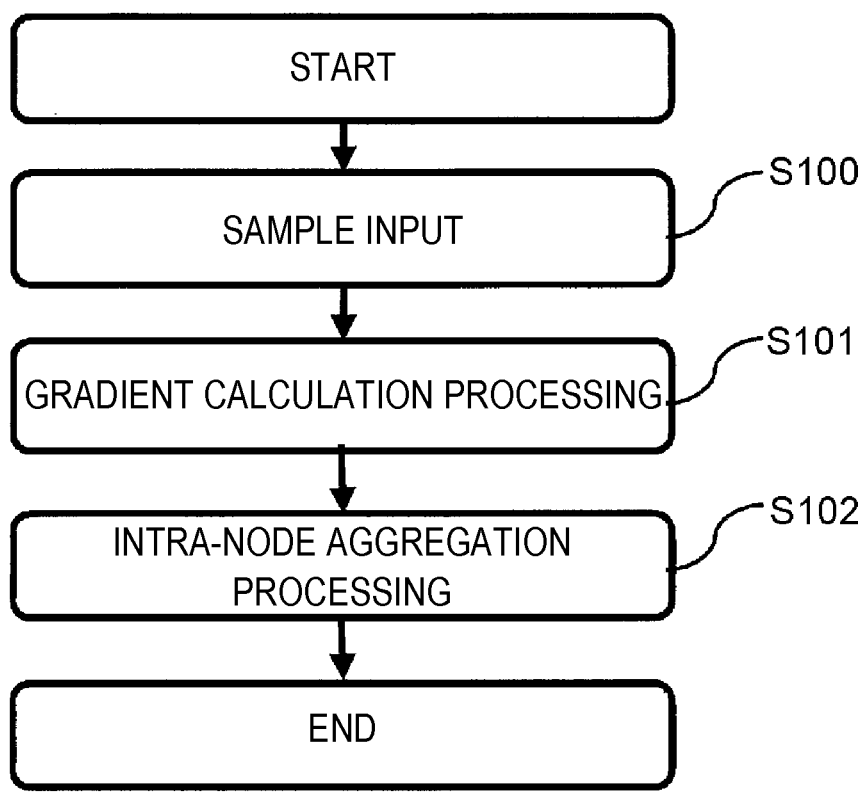
FIG. 3 is a flowchart explaining sample data input processing, gradient calculation processing and intra-node aggregation processing of the distributed processing node according to the first embodiment of the present invention.

FIG. 3 is a flowchart explaining sample data input processing, gradient calculation processing and intra-node aggregation processing of the distributed processing node 2[n]. The sample input unit 20 of each distributed processing node 2[n] (n=1, . . . , N) inputs different S pieces (S is an integer equal to or larger than 2) of sample data x[n, s] (s=1, . . . , S) from the data collection node not illustrated for each mini batch (step S100 in FIG. 3).

Note that the embodiment of the present invention is not limited by a collection method of the sample data by the data collection node and a method of dividing the collected sample data into N sets and distributing it to each distributed processing node 2[n], and is applicable regardless of the methods.

When the sample data x[n, s] is inputted, the gradient calculation processing unit 21 of each distributed processing node 2[n] (n=1, . . . , N) calculates a gradient G[m, n, s] of the loss function of the neural network 26 for each piece of the sample data x[n, s], for each of M (M is an integer equal to or larger than 2) weights w[m] (m=1, . . . , M) of the neural network 26 of a learning object (step S101 in FIG. 3).

Since a method of constructing the neural network 26 in each distributed processing node 2[n] by software, the weight w[m] of the neural network 26, the loss function which is an index indicating inferiority of performance of the neural network 26, and the gradient G[m, n, s] of the loss function are well-known technology, detailed description is omitted.

Subsequently, the intra-node aggregation processing unit 22 of each distributed processing node 2[n] (n=1, . . . , N) generates and holds distributed data D[m, n] that is a numerical value for which the gradient G[m, n, s] for each piece of the sample data is aggregated, for each weight w[m] (step S102 in FIG. 3). A calculation formula of the distributed data D[m, n] is as follows.

[Formula 1]

$$D[m,n]=\Sigma_{s=1,\ldots,S}G[m,n,s] \quad (1)$$

Note that the gradient calculation processing by the gradient calculation processing unit 21 and the intra-node aggregation processing by the intra-node aggregation processing unit 22 can be pipelined in units of the sample data (the gradient calculation processing is performed to a certain piece of the sample data and the intra-node aggregation processing of aggregating the gradient obtained from the sample data one piece before is executed simultaneously).

Figure 4:
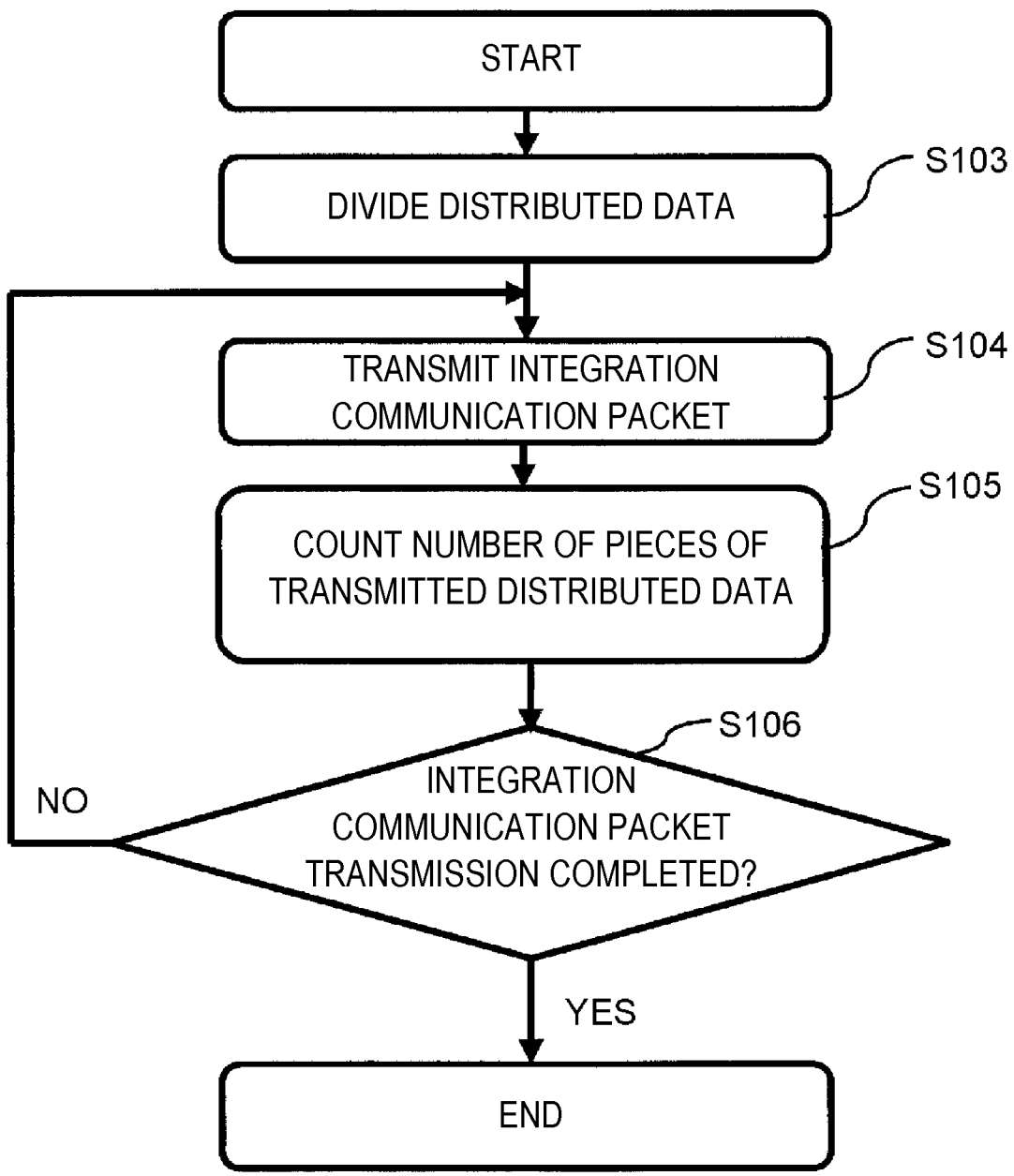
FIG. 4 is a flowchart explaining integration communication processing of the distributed processing node according to the first embodiment of the present invention.

FIG. 4 is a flowchart explaining integration communication processing of the distributed processing node 2[n]. The transmission unit 23 of each distributed processing node 2[n] (n=1, . . . , N) performs integration communication of packetizing the distributed data D[m, n] (m=1, . . . , M) for each weight w[m] in an order of a number m of the weight w[m] and transmitting the data to the aggregation processing node 1. In addition, in integration communication packet transmission, after division of the distributed data D[m, n] is completed, a number Mt of pieces of the transmitted distributed data D[m, n] after the transmission is started is counted until the integration communication packet transmission is completed.

At the time, the transmission unit 23 of each distributed processing node 2[n] (n=1, . . . , N) divides M pieces of held distributed data D[m, n] (m=1, . . . , M) among Pg (Pg is an integer equal to or larger than 2) integration communication packets by every Lg pieces (Lg is an integer equal to or larger than 1 and smaller than M) of data (step S103 in FIG. 4), and transmits the Pg integration communication packets to the aggregation processing node 1 in order (step S104 in FIG. 4) until the transmission of all the integration communication packets is ended (YES in step S106 in FIG. 4). That is, in an integration communication packet SP[p, n] transmitted in a p-th order (p=1, . . . , Pg), Lg pieces of the distributed data D[i, n] (i=Lg×(p−1)+1, l=1, . . . , Lg) are stored.

Note that, under a condition where M cannot be divided by Lg, in a Pg-th integration communication packet SP[Pg, n], (M−Lg×(Pg−1)) pieces of distributed data D[i, n] (i=Lg× (Pg−1)+q, q=1, . . . , M−Lg×(Pg−1)) are stored.

For the Pg-th integration communication packet SP[Pg, n], {Lg−(M−Lg×(Pg−1))} dummy numerical values may be added after (M−Lg×(Pg−1)) pieces of distributed data D[i, n] such that all the integration communication packets equally store Lg pieces of data.

In addition, as described above, the transmission count unit 27 inside the transmission unit 23 counts the number Mt of pieces of the transmitted distributed data D[m, n] (step S105 in FIG. 4), from transmission start of a first integration communication packet SP[1, n] to transmission completion of all the Pg integration communication packets SP[p, n] (YES in step S106).

At a point of time at which the p-th integration communication packet SP[p, n] is transmitted, p×Lg pieces of the distributed data D[m, n] are transmitted from the transmission start so that the value of Mt is p×Lg. Note that the transmission count unit 27 defines Mt=M regardless of the value of p×Lg at the point of time at which all the Pg integration communication packets SP[p, n] are transmitted.

Figure 5:
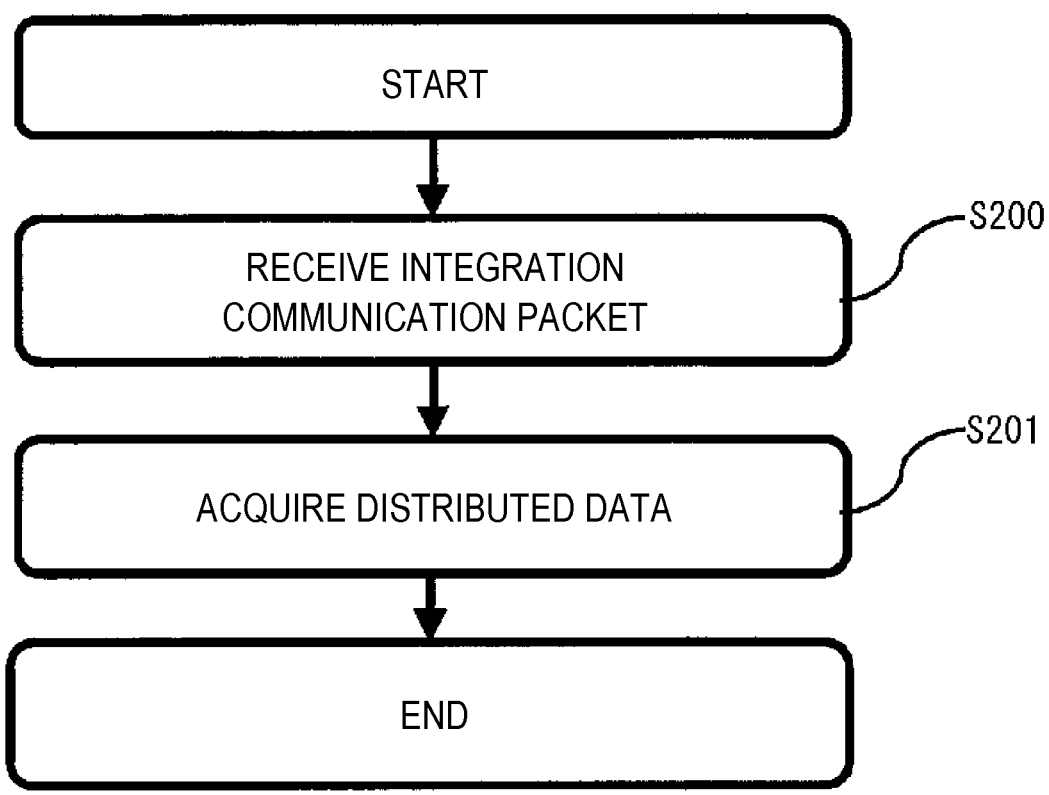
FIG. 5 is a flowchart explaining integration communication processing of an aggregation processing node according to the first embodiment of the present invention.

FIG. 5 is a flowchart explaining the integration communication processing of the aggregation processing node 1. In the integration communication, the aggregation processing node 1 receives each integration communication packet SP[p, n] (p=1, . . . , Pg) transmitted by each distributed processing node 2[*n*] (step S200 in FIG. 5).

The aggregation processing node 1 acquires Lg pieces of the distributed data D[i, n] (i=Lg×(p−1)+1, l=1, . . . , Lg) held by the distributed processing node 2[*n*] from the received integration communication packet SP[p, n] (step S201 in FIG. 5).

In this way, the aggregation processing node 1 can acquire the distributed data D[m, n] (m=1, . . . , M) held by each distributed processing node 2[*n*] (n=1, . . . , N) in the order of the number m of the weight w[m].

Figure 6:
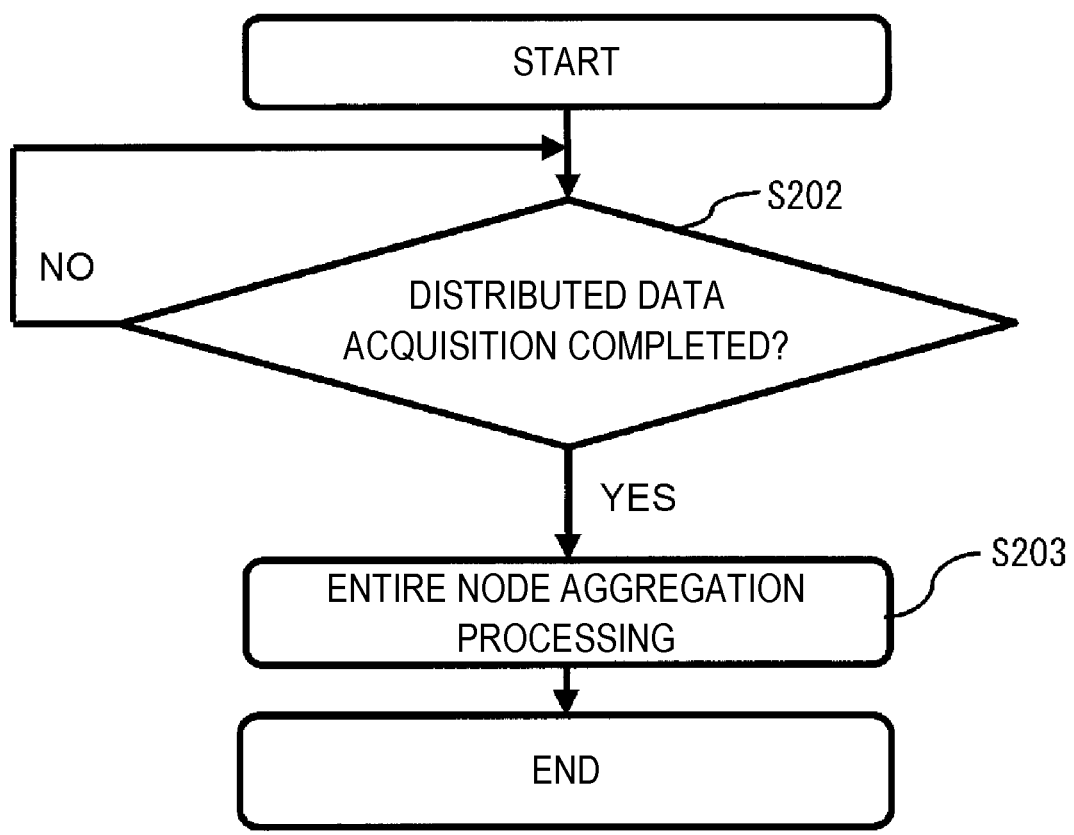
FIG. 6 is a flowchart explaining entire node aggregation processing of the aggregation processing node according to the first embodiment of the present invention.

FIG. 6 is a flowchart explaining entire node aggregation processing of the aggregation processing node 1. After ending acquisition of the distributed data D[m, n] of the weight w[m] from each distributed processing node 2[*n*] (n=1, . . . , N) (YES in step S202 in FIG. 6), the aggregation processing node 1 performs the entire node aggregation processing of aggregating the acquired distributed data D[m, n] of all the distributed processing nodes 2[*n*] for each weight w[m], and generates aggregation data R[m] (step S203 in FIG. 6). A calculation formula of the aggregation data R[m] is as follows.

[Formula 2]

$$R[m]=\Sigma_{N=1,\ldots,N}D[m,n] \quad (2)$$

In this way, the aggregation processing is the processing of calculating the aggregation data R[m] based on the distributed data D[m, n] acquired in the order of the number m. Therefore, the aggregation processing node 1 can generate the aggregation data R[m] in the order of the number m.

Figure 7:
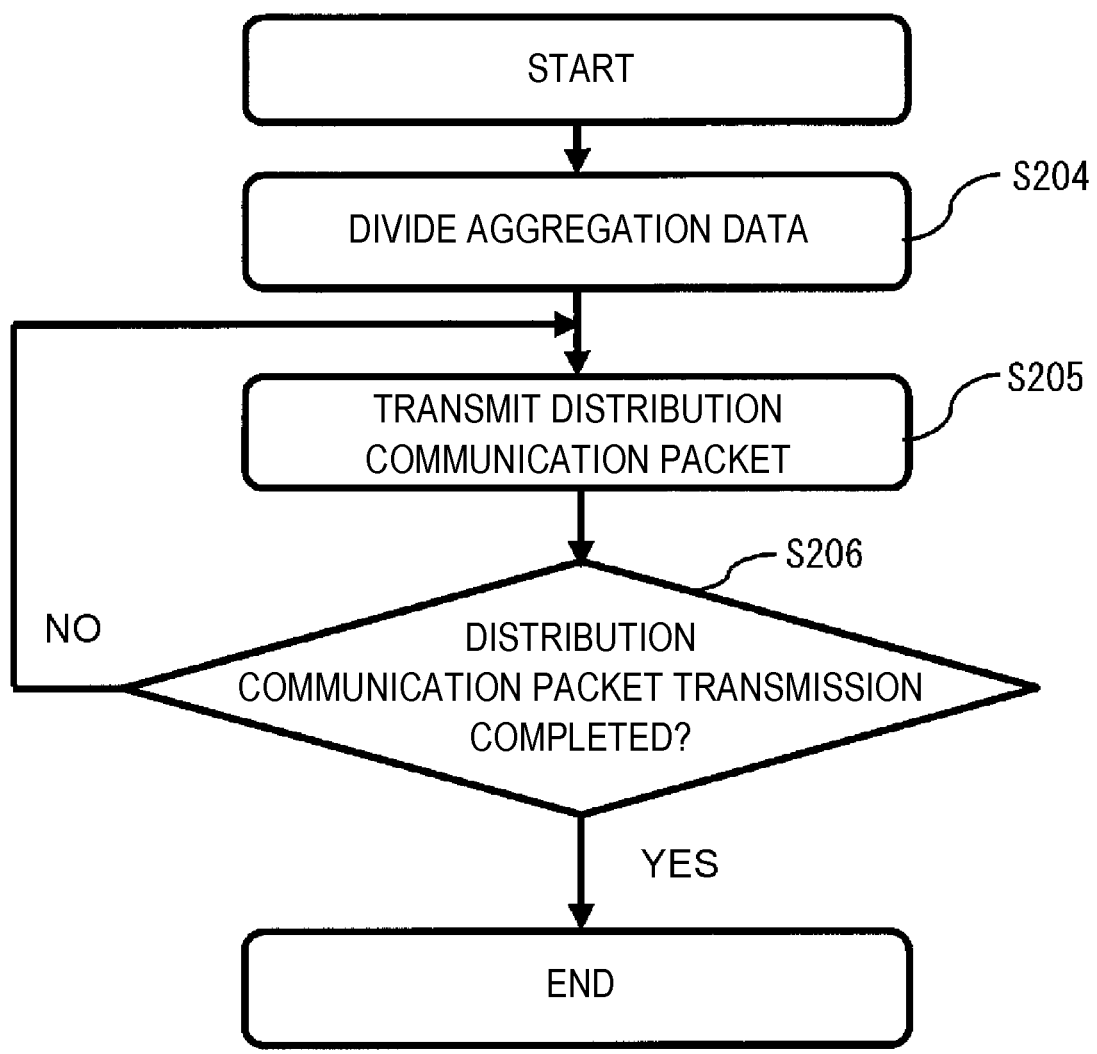
FIG. 7 is a flowchart explaining distribution communication processing of the aggregation processing node according to the first embodiment of the present invention.

FIG. 7 is a flowchart explaining distribution communication processing of the aggregation processing node 1. The aggregation processing node 1 performs distribution communication of packetizing the aggregation data R[m] (m=1, . . . , M) for each weight w[m] in the order of the number m of the weight w[m] and transmitting the data to each distributed processing node 2[*n*] (n=1, . . . , N).

At the time, the aggregation processing node 1 divides M pieces of the aggregation data R[m] (m=1, . . . , M) among Ps (Ps is an integer equal to or larger than 2) distribution communication packets by every Ls pieces (Ls is an integer equal to or larger than 1 and smaller than M) of data (step S204 in FIG. 7), and transmits the Ps distribution communication packets to each distributed processing node 2[*n*] (n=1, . . . , N) in order (step S205 in FIG. 7) until the transmission of all the distribution communication packets is ended (YES in step S206 in FIG. 7). That is, in a distribution communication packet DP[p, n] transmitted in the p-th order (p=1, . . . , Ps) to the distributed processing node 2[*n*], Ls pieces of aggregation data R[j] (j=Ls×(p−1)+k, k=1, . . . , Ls) are stored.

Note that, under the condition where M cannot be divided by Ls, in a Ps-th distribution communication packet DP[Ps, n], (M−Ls×(Ps−1)) pieces of the aggregation data R[j] (j=Ls×(Ps−1)+o, o=1, . . . , M−Ls×(Ps−1)) are stored.

For the Ps-th distribution communication packet DP[Ps, n], {Ls−(M−Ls×(Ps−1))} dummy numerical values may be added after (M−Ls×(Ps−1)) pieces of the aggregation data R[j] such that all the distribution communication packets equally store Ls pieces of data.

Figure 8:
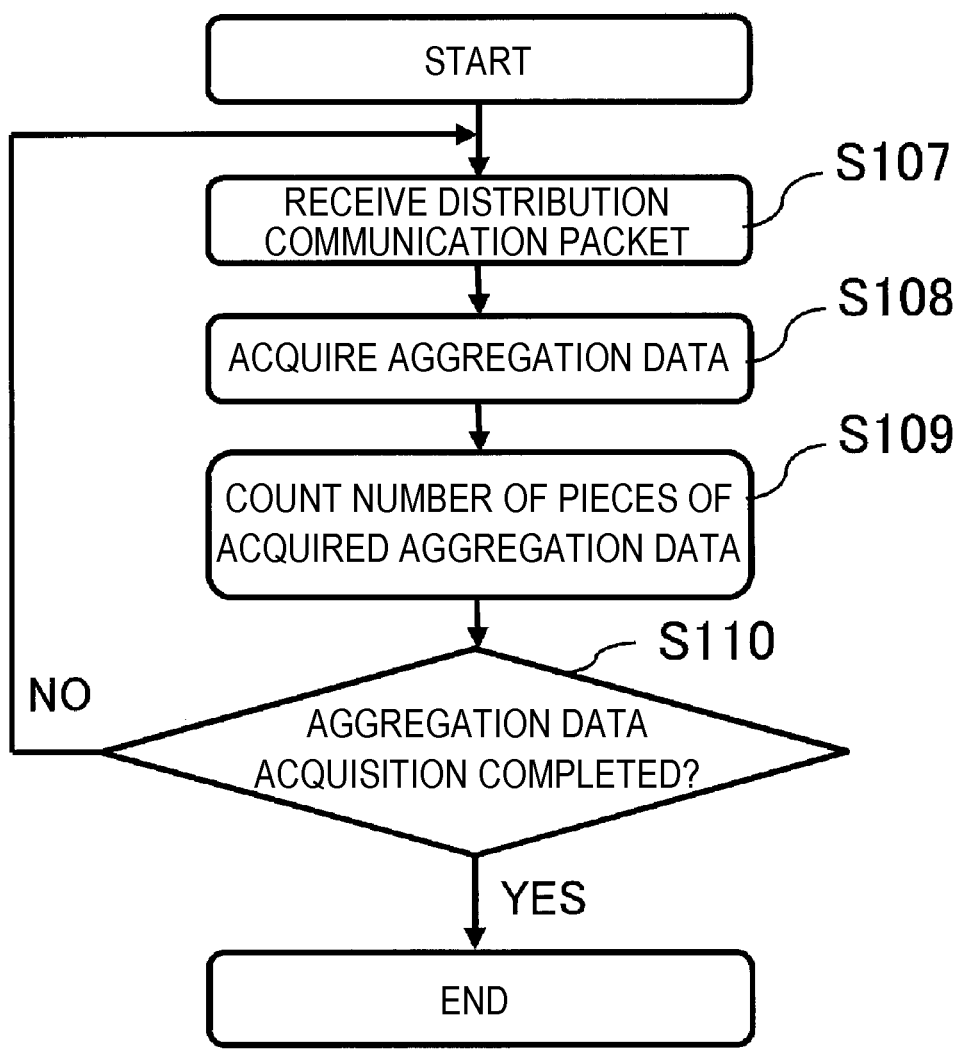
FIG. 8 is a flowchart explaining the distribution communication processing of the distributed processing node according to the first embodiment of the present invention.

FIG. 8 is a flowchart explaining the distribution communication processing of the distributed processing node 2[*n*]. In the distribution communication, the reception unit 24 of each distributed processing node 2[*n*] (n=1, . . . , N) receives each distribution communication packet DP [p, n] (p=1, . . . , Ps) transmitted by the aggregation processing node 1 in order (step S107 in FIG. 8).

Then, the reception unit 24 of each distributed processing node 2[*n*] (n=1, . . . , N) acquires Ls pieces of the aggregation data R[j] (j=Ls×(p−1)+k, k=1, . . . , Ls) generated by the aggregation processing node 1 from the received distribution communication packet DP [p, n] (step S108 in FIG. 8). In addition, the reception count unit 28 of the reception unit 24 counts a number Mr of the acquired aggregation data R[m] (step S109 in FIG. 8) from reception start of a first distribution communication packet DP [1, n] until acquisition completion of all M pieces of the aggregation data (YES in step S110 in FIG. 8).

In this way, each distributed processing node 2[*n*] (n=1, . . . , N) can acquire the aggregation data R[m] (m=1, . . . , M) generated by the aggregation processing node 1 in the order of the number m of the weight w[m].

At the point of time at which the aggregation data R[m] is acquired from the p-th distribution communication packet DP [p, n], p×Ls pieces of the aggregation data R[j] are received from acquisition start so that the value of Mr is p×Ls. Note that the reception count unit 28 defines Mr=M regardless of the value of p×Ls at the point of time at which all the Ps distribution communication packets DP [p, n] are received.

Note that in the distribution communication packet DP [p, n] transmitted in the p-th order by the aggregation processing node 1, the same aggregation data R[j] (j=Ls×(p−1)+k, k=1, . . . , Ls) is stored regarding all the distributed processing nodes 2[*n*]. Therefore, when it is not needed to specify an address of the distribution communication packet DP [p, n] (for example, when a route is different for each distributed processing node as in FIG. 1, or when interposing a network capable of multicast to all the distributed processing nodes 2[*n*]), the same distribution communication packet DP [p] may be transmitted to all the distributed processing nodes 2[*n*].

Figure 9:
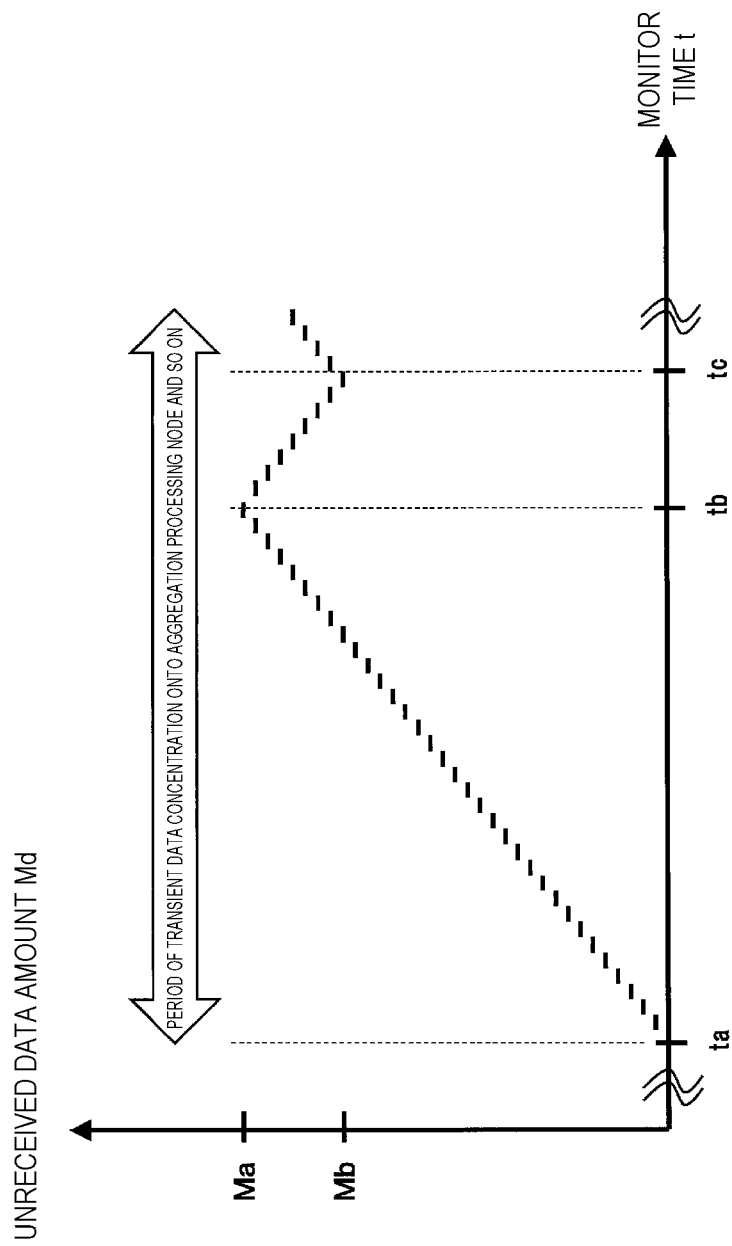
FIG. 9 is a diagram illustrating a transition of an unreceived data amount of the distributed processing node according to the first embodiment of the present invention.
Figure 10:
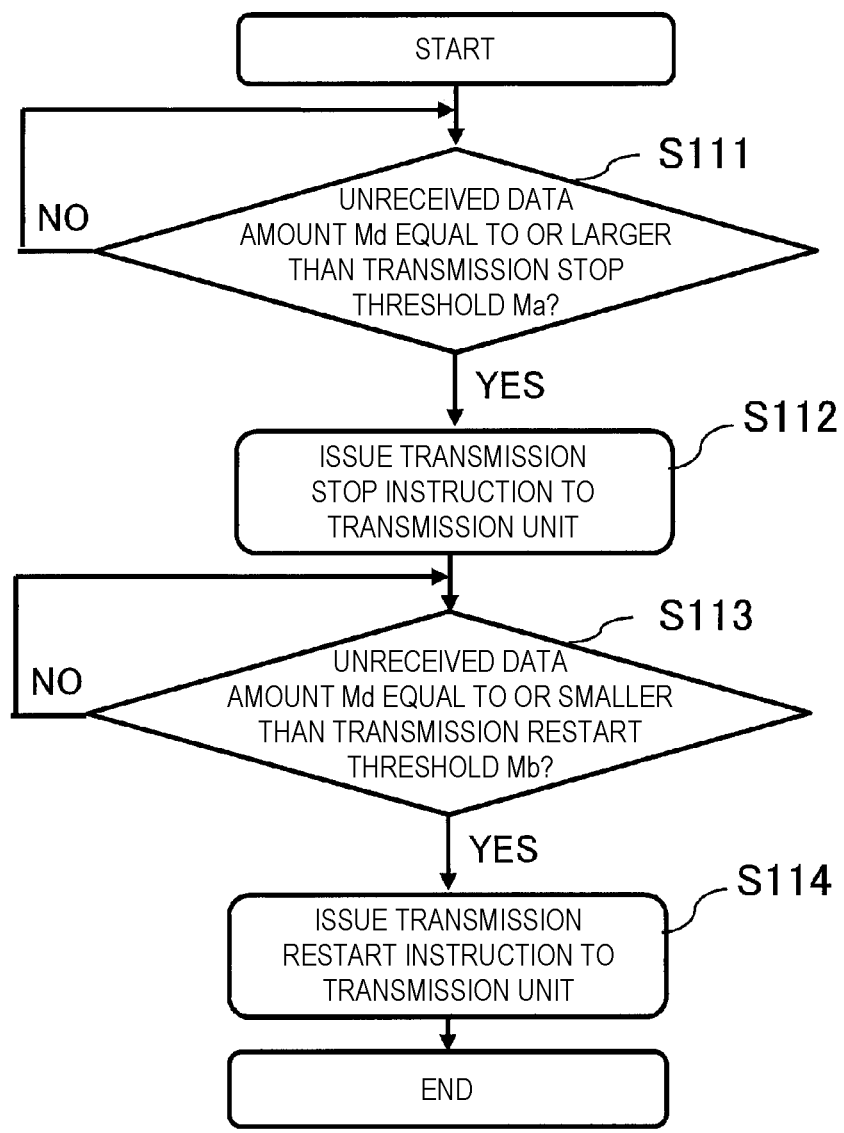
FIG. 10 is a flowchart explaining an operation of a transmission control unit of the distributed processing node according to the first embodiment of the present invention.

In a series of processing between the aggregation processing node 1 and each distributed processing node 2[*n*] described above, a role of the transmission control unit 29 of each distributed processing node 2[*n*] will be described. FIG. 9 is a diagram illustrating a transition of the unreceived data amount of the distributed processing node 2[*n*], and FIG. 10 is a flowchart explaining an operation of the transmission control unit 29. A vertical axis in FIG. 9 is an unreceived data amount Md, and a horizontal axis is monitor time t. Note that the unreceived data amount Md is a difference (Mt−Mr) between count values of the transmission count unit 27 and the reception count unit 28, or an amount equivalent to (Mt−Mr).

In an example in FIG. 9, it is assumed that a processing delay occurs in the aggregation processing node 1 due to transient data concentration onto the aggregation processing node 1 from the plurality of distributed processing nodes 2[*n*] for example, after a lapse of monitor time ta. With the processing delay as a trigger, a transmission speed of the distribution communication packet DP [p, n] from the aggregation processing node 1 to each distributed processing node 2[n] becomes slow, and the unreceived data amount of the distributed processing node 2[n], that is, the difference Md=Mt−Mr between the count values of the transmission count unit 27 and the reception count unit 28 increases.

In such a situation where the processing delay continuously occurs, when the unreceived data amount Md becomes equal to or larger than a predetermined transmission stop threshold Ma (Ma is a positive integer smaller than M) (YES in step S111 in FIG. 10), the transmission control unit 29 of the distributed processing node 2[n] issues a transmission stop instruction to the transmission unit 23 of the present node (step S112 in FIG. 10). By issuance of the transmission stop instruction, the transmission (step S104 in FIG. 4) of the integration communication packet SP[p, n] from the distributed processing node 2[n] is stopped. For example, in the example in FIG. 9, the unreceived data amount Md becomes equal to or larger than the transmission stop threshold Ma at monitor time tb, and the transmission of the integration communication packet SP[p, n] is stopped.

Since the distribution communication packet DP [p, n] of the transmission of which is delayed is transmitted from the aggregation processing node 1, with transmission stop of the integration communication packet SP[p, n] as a trigger, the unreceived data amount Md decreases. When the unreceived data amount Md becomes equal to or smaller than a predetermined transmission restart threshold Mb (Mb is a positive integer smaller than Ma) (YES in step S113 in FIG. 10), the transmission control unit 29 issues a transmission restart instruction to the transmission unit 23 of the present node (step S114 in FIG. 10). By the issuance of the transmission restart instruction, the transmission (step S104 in FIG. 4) of the integration communication packet SP[p, n] from the distributed processing node 2[n] is restarted. For example, in the example in FIG. 9, the unreceived data amount Md becomes equal to or smaller than the transmission restart threshold Mb at monitor time tc, and the transmission of the integration communication packet SP[p, n] is restarted.

Note that while the transient data concentration onto the aggregation processing node 1 is described as a case where the processing delay occurs, when many examples are to be given in more detail, the processing delay occurs due to single or composite factors, that is, various factors such as a delay due to packet storage in a packet buffer that absorbs transfer processing in an interface such as PCI Express, a transfer rate speed difference between input and output and a clock speed difference or a processing delay due to a memory band rate limitation when acquiring data from a memory, in the distributed processing node 2[n], between the distributed processing node 2[n] and the aggregation processing node 1, or in the aggregation processing node 1 respectively. In a configuration of the present embodiment, adaptation is possible to any range to be such a processing delay.

In addition, when the configuration of the present embodiment is not adopted, it is possible that such a processing delay that the integration communication packet cannot be stored in the packet buffer of the aggregation processing node 1 occurs, a frame loss by buffer overflow occurs, and the processing is stopped or an erroneous result is obtained due to a lost frame. However, in the configuration of the present embodiment, since the transmission is controlled in the distributed processing node 2[n] according to a size of the unreceived data amount Md, the transmission of the distributed processing node 2[n] can be stopped before a packet loss is generated in the packet buffer of the aggregation processing node 1. As a result, the packet loss can be eliminated, the processing delay due to recalculation caused by an instable operation such as the processing stop of the aggregation processing node 1 and the erroneous result can be avoided, and an efficient and stable processing operation becomes possible.

Figure 11:
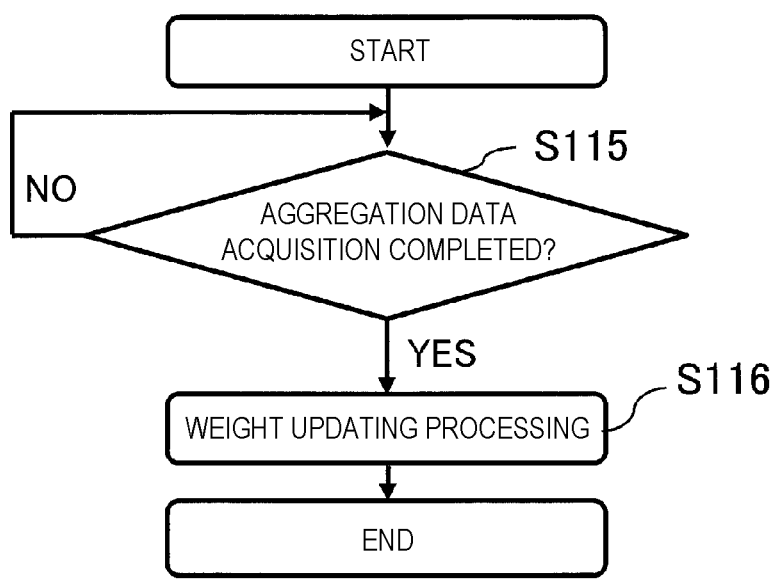
FIG. 11 is a flowchart explaining weight updating processing of the distributed processing node according to the first embodiment of the present invention.

FIG. 11 is a flowchart explaining weight updating processing of the distributed processing node 2[n]. After the aggregation data R[m] of the weight w[m] is acquired from the aggregation processing node 1 (YES in step S115 in FIG. 11), the weight updating processing unit 25 of each distributed processing node 2[n] (n=1, . . . , N) performs the weight updating processing of updating the weight w[m] of the neural network 26 inside the present node respectively based on the acquired aggregation data R[m] (step S116 in FIG. 1).

In the weight updating processing, the weight w[m] is updated for each number m such that the loss function becomes minimum based on the gradient of the loss function indicated by the aggregation data R[m]. Since updating of the weight w[m] is well-known technology, the detailed description is omitted.

In this way, the weight updating processing is the processing of updating the weight w[m] based on the aggregation data R[m] acquired in the order of the number m of the weight w[m]. Therefore, each distributed processing node 2[n] (n=1, . . . , N) can perform the weight updating processing to the weight w[m] in the order of the number m.

By the end of the weight updating processing, one round of mini batch learning is ended, and each distributed processing node 2[n] (n=1, . . . , N) and the aggregation processing node 1 continuously perform the processing of the next mini batch learning based on the updated weight. That is, each distributed processing node 2[n] receives the sample data for the next mini batch learning from the data collection node not illustrated, and repeats the processing of the mini batch learning described above, and thus inference accuracy of the neural network 26 is improved.

Note that repetition of the mini batch learning is ended (A) when the number of times of the mini batch learning reaches a predetermined value, (B) when the inference accuracy (a correct answer rate when the neural network 26 is made to perform inference processing on a problem the correct answer of which is known, for example) exceeds a predetermined threshold, (C) when improvement of the inference accuracy of the neural network 26 stops (when a rise of the inference accuracy falls below a predetermined threshold when the predetermined number of times of the mini batch learning are repeated), or (D) when at least two of (A)-(C) are combined. Such an end of the repetition of the mini batch learning may be individually determined by each distributed processing node 2[n] (n=1, . . . , N), or may be generally determined by the aggregation processing node 1.

Hereinafter, a sequence configured by the integration communication processing, the entire node aggregation processing, the distribution communication processing and the weight updating processing and the effect will be described first using FIG. 12, and then a new effect by the transmission control (transmission stop and transmission restart) of the distributed processing node 2[n] of the present embodiment will be described using FIG. 13.

Figure 12:
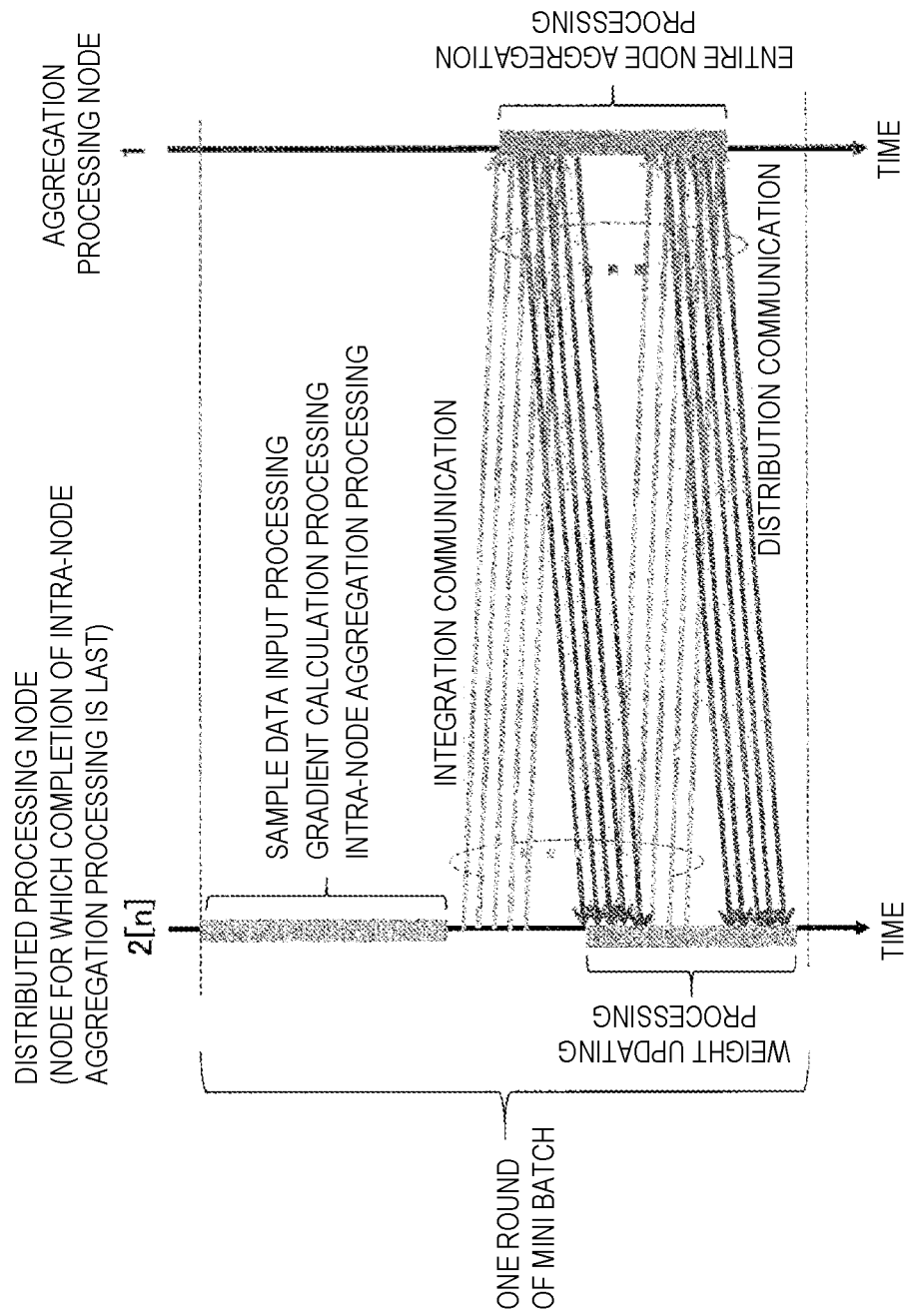
FIG. 12 is a diagram illustrating a sequence of processing of the aggregation processing node and the distributed processing node according to the first embodiment of the present invention.

FIG. 12 illustrates the sequence of the processing of the aggregation processing node 1 and the distributed processing node 2[n]. As described above, the integration communication processing is performed in which each distributed processing node 2[n] (n=1, . . . , N) packetizes M pieces of the distributed data D[m, n] (m=1, . . . , M) in the order of the number m of the weight w[m] and transmits the data to the aggregation processing node 1 and the aggregation processing node 1 acquires M pieces of the distributed data D[m, n] (m=1, . . . , M) in the order of the number m.

Further, the aggregation processing node 1 performs the entire node aggregation processing of generating the aggregation data R[m] (m=1, . . . , M) in the order of the number m based on M pieces of the distributed data D[m, n] (m=1 . . . , M) acquired in the order of the number m of the weight w[m].

Further, the distribution communication processing is performed in which the aggregation processing node 1 packetizes M pieces of the aggregation data R[m] (m=1, . . . , M) generated in the order of the number m of the weight w[m] in the order of the number m and transmits the data to each distributed processing node 2[n] (n=1, . . . , N) and each distributed processing node 2[n] (n=1, . . . , N) acquires M pieces of the aggregation data R[m] (m=1, . . . , M) in the order of the number m.

Furthermore, each distributed processing node 2[n] (n=1, . . . , N) performs the weight updating processing of updating the M weights w[m] in the order of the number m, based on M pieces of the aggregation data R[m] (m=1, . . . , M) acquired in the order of the number m.

In the present embodiment, the integration communication processing, the entire node aggregation processing, the distribution communication processing, and weight updating processing can be performed almost simultaneously in parallel (by a pipeline), and when compared to a sequence (FIG. 15) by conventional technology with which the next processing cannot be started until each communication and each processing are ended, processing time can be substantially shortened.

That is, while the transmission unit 23 of each distributed processing node 2[n] (n=1, . . . , N) and the aggregation processing node 1 perform the integration communication processing described in FIG. 4 and FIG. 5 for the distributed data D[m, n] of a certain weight w[m] among the M weights w[m], the aggregation processing node 1 performs the entire node aggregation processing described in FIG. 6 for the acquired distributed data D[m, n] of the weight w[m] the number m of which is smaller than that of the weight w[m] under the integration communication processing. For the aggregation-processed aggregation data R[m] of the weight w[m] the number m of which is smaller than that of the weight w[m] under the entire node aggregation processing, the aggregation processing node 1 and the reception unit 24 of each distributed processing node 2[n] (n=1, . . . , N) perform the distribution communication processing described in FIG. 7 and FIG. 8. Based on the acquired aggregation data R[m] of the weight w[m] the number m of which is smaller than that of the weight w[m] under the distribution communication processing, the weight updating processing unit 25 of each distributed processing node 2[n] (n=1, . . . , N) performs the weight updating processing described in FIG. 11.

Therefore, for example, when time T is required for each of the integration communication processing, the entire node aggregation processing, the distribution communication processing and the weight updating processing, time 4T is required to end all the processing by the conventional technology; however, time T+α is sufficient in the present embodiment. Here, the a is delay time from the time of point at which an arbitrary distributed processing node 2[n] transmits arbitrary distributed data D[m, n] to the aggregation processing node 1 until updating of the weight w[m] is completed. In the present embodiment, since the processing is pipelined in units of the number m of the weight w[m], the time a is sufficiently short time compared to T. Thus, in the present embodiment, compared to the conventional technology, the time required for the integration communication processing, the entire node aggregation processing, the distribution communication processing and the weight updating processing can be shortened to about ¼.

Next, the effect by the transmission control (the transmission stop and the transmission restart) of the distributed processing node 2[n] of the present embodiment will be described. In an operation explanation in FIG. 12, influence by the processing delay of the aggregation processing node 1, that is, the influence on a sequential operation when unreceived data is generated in the distributed processing node 2[n] is not taken into consideration.

Figure 13:
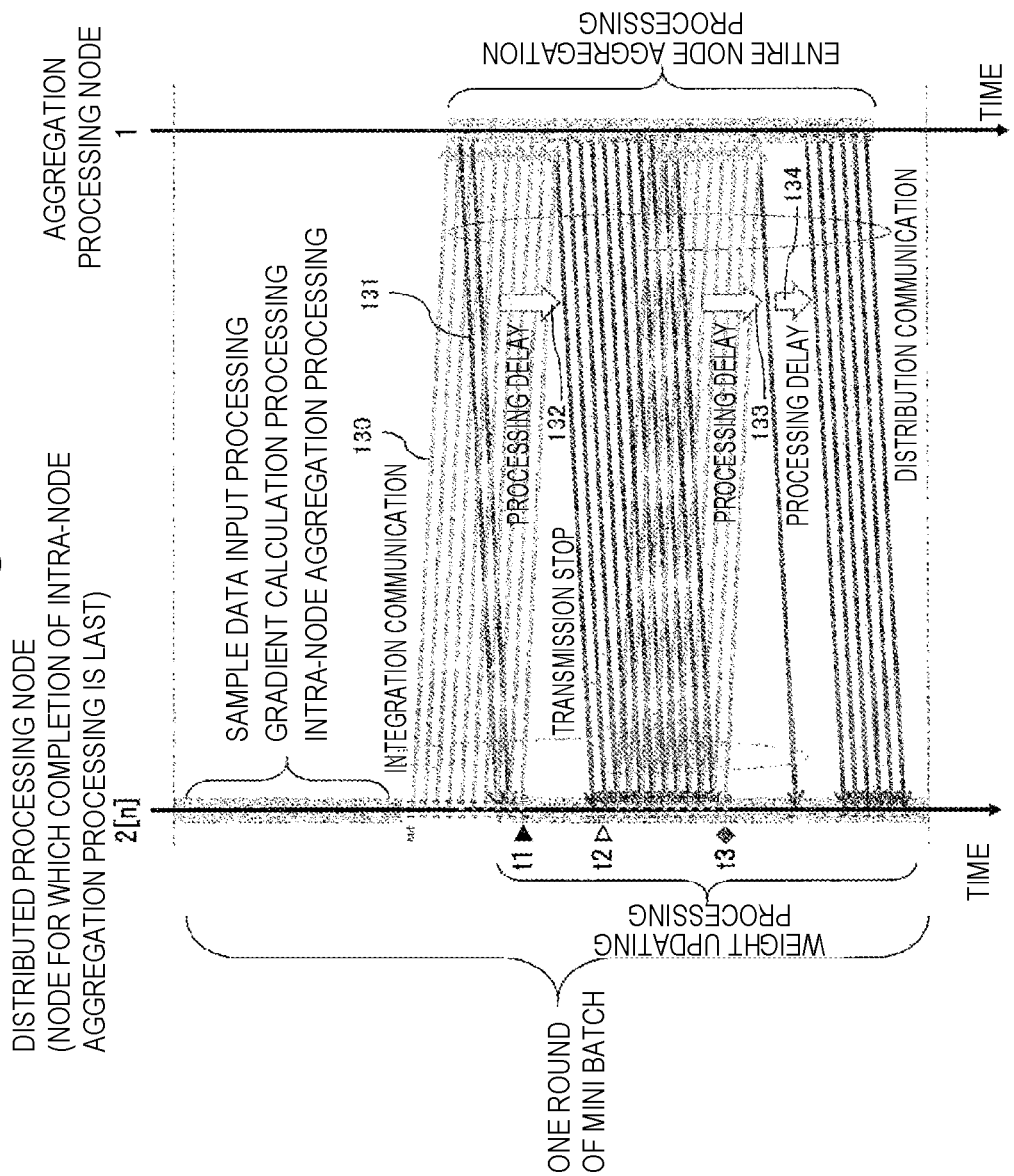
FIG. 13 is a diagram explaining an effect of transmission control of the distributed processing node in the first embodiment of the present invention.

FIG. 13 illustrates the communication between the distributed processing node 2[n] and the aggregation processing node 1 when the processing delay occurs in the aggregation processing node 1 and the distributed processing node 2[n] performs the transmission control. In an example in FIG. 13, it is defined that M=20, Lg=Ls=1, Ma=8 and Mb=6. That is, the distributed data with a data amount of 1 is included in each integration communication packet indicated by each arrow 130 from the distributed processing node 2[n] to the aggregation processing node 1, and the aggregation data with a data amount of 1 is included in each distribution communication packet indicated by each arrow 131 from the aggregation processing node 1 to the distributed processing node 2[n].

In the example in FIG. 13, the integration communication packets are consecutively transmitted from the distributed processing node 2[n], and at timing at which a second integration communication packet is received in the aggregation processing node 1, a first distribution communication packet is transmitted from the aggregation processing node 1 to the distributed processing node 2[n], and a second distribution communication packet is transmitted in succession further. However, after a third integration communication packet is received in the aggregation processing node 1, since a load of the aggregation processing node 1 increases, the transmission of a third distribution communication packet is delayed. On the other hand, in contrast to the processing delay in the aggregation processing node 1, the integration communication packets are consecutively transmitted until a tenth integration communication packet from the distributed processing node 2[n].

Here, when paying attention to the count values Mt and Mr of the transmission count unit 27 and the reception count unit 28 of the distributed processing node 2[n], at the point of time immediately after transmitting a seventh integration communication packet from the distributed processing node 2[n], since the distribution communication packet from the aggregation processing node 1 has not arrived, the unreceived data amount Md=Mt−Mr increases from an initial value Md=1(1×Lg) to Md=7(7×Lg) for each transmission of the integration communication packet. The distribution communication packet transmitted from the aggregation processing node 1 arrives when an eighth integration communication packet is transmitted from the distributed processing node 2[n]; however, in the situation, the unreceived data amount is Md=Mt−Mr=8−1, and is 7 as it is.

As described above, even though the transmission is consecutively performed until the second distribution communication packet from the aggregation processing node 1, the transmission of the third distribution communication packet is delayed by the processing delay indicated by an arrow 132 in FIG. 13. In this case, the unreceived data amount Md is 7 as it is at the point of time at which a ninth integration communication packet is transmitted from the distributed processing node 2[n]; however, when the tenth integration communication packet is transmitted from the distributed processing node 2[n] at timing t1 in FIG. 13, since the third distribution communication packet has not arrived from the aggregation processing node 1, the unreceived data amount Md is counted up by one and becomes Md=8.

Since the unreceived data amount Md reaches the transmission stop threshold Ma=8, the transmission stop instruction is issued from the transmission control unit 29 of the distributed processing node 2[n] to the transmission unit 23, and the integration communication packet transmission of the distributed processing node 2[n] is stopped.

In a short time after the transmission of the integration communication packet from the distributed processing node 2[n] is stopped, the third distribution communication packet transmitted from the aggregation processing node 1 with delay reaches the distributed processing node 2[n]. Thus, the unreceived data amount becomes Md=7. At the timing at which a fourth distribution communication packet is transmitted from the aggregation processing node 1, the integration communication packet does not reach the aggregation processing node 1 due to the transmission stop of the distributed processing node 2[n], and the processing in the aggregation processing node 1 becomes light. Therefore, the distribution communication packets are consecutively transmitted from the aggregation processing node 1. When the distributed processing node 2[n] receives the fourth distribution communication packet at timing t2 in FIG. 13, the unreceived data amount Md is counted down by one and becomes Md=6.

Since the unreceived data amount Md reaches the transmission restart threshold Mb=6, the transmission restart instruction is issued from the transmission control unit 29 of the distributed processing node 2[n] to the transmission unit 23, and the transmission of the integration communication packet is restarted. Since the transmission is stopped at the point of time of transmitting the tenth integration communication packet, the transmission is restarted from an 11th integration communication packet. After the transmission is restarted, the distribution communication packet from the aggregation processing node 1 arrives so that the unreceived data amount is Md=Mt−Mr=7−1, and is 6 as it is. Such a state continues until a 19th integration communication packet is transmitted and Md=6 is maintained.

In the meantime, when paying attention to the integration communication packets arriving at the aggregation processing node 1, after the transmission is restarted, the 11th to 19th integration communication packets consecutively arrive at the aggregation processing node 1. Simultaneously with the reception of 11th to 13th integration communication packets in particular, the distribution communication packets are transmitted from the aggregation processing node 1. The load of the aggregation processing node 1 again becomes heavy in the situation, and the delay of the distribution communication packet transmission occurs. That is, after the 13th distribution communication packet is transmitted from the aggregation processing node 1, the transmission of a next 14th distribution communication packet is delayed by the processing delay indicated by an arrow 133 in FIG. 13.

By the processing delay, at the timing at which a 20th integration communication packet is transmitted from the distributed processing node 2[n], the distribution communication packet from the integration processing node 1 stops reaching due to the delay. In the case in FIG. 13, it is M=20, the 10th integration communication packet is transmitted from the distributed processing node 2[n] at timing t3, and all the transmission is completed, so that the transmission from the distributed processing node 2[n] is stopped regardless of the unreceived data amount Md.

Further, when the processing delay indicated by an arrow 134 in FIG. 13 occurs after the transmission of the 14th distribution communication packet from the aggregation processing node 1, a 15th distribution communication packet is transmitted with delay from the aggregation processing node 1. Since integration communication packet transmission from the distributed processing node 2[n] to the aggregation processing node 1 is already completed, the load of the aggregation processing node 1 is light, and the integration processing node 1 consecutively transmits the 15th to 10th distribution communication packets after the processing delay is dissolved. At the point of time at which the distributed processing node 2[n] receives the 20th distribution communication packet, the unreceived data amount becomes Md=0.

Note that at the point of time of receiving Ps=20 distribution communication packets from the aggregation processing node 1 and ending the acquisition of M=20 pieces of the aggregation data R[m] (YES in step S110 in FIG. 8), the transmission count unit 27 and the reception count unit 28 of the distributed processing node 2[n] respectively initialize the count values Mt and Mr to 0. Thus, the unreceived data amount Md also becomes 0, and the transmission count unit 27 and the reception count unit 28 turn to a standby state for integration transmission start of the data by the next mini batch.

As described above, in the present embodiment, in the distributed processing node 2[n], by monitoring a difference between a transmission data amount and a reception data amount, that is, the unreceived data amount Md in the distributed processing node 2[n], and controlling the transmission, the transient load onto the aggregation processing node 1 is reduced and stable processing is made possible.

Note that when load increase of the aggregation processing node 1 is to be described further in detail, for example, when software is interposed in the processing of the aggregation processing node 1, a CPU (Central Processing Unit) is tightened by a large amount of processing, and thus the processing delay occurs. In addition, in the case of processing the integration communication packet by hardware, when tentatively preserving packets in a reception buffer that is a memory like a so-called FIFO (First In, First Out) before hardware processing, since a depth (memory size) of the FIFO is limited, the buffer overflow occurs, the packet to be processed gets lost, and the load of the aggregation processing node 1 becomes heavy.

In order to solve such a problem that the load of the aggregation processing node 1 becomes heavy, when the unreceived data amount Md increases, the transmission from the distributed processing node 2[n] is stopped and the packet loss due to the load increase of the CPU in the aggregation processing node 1 and the buffer overflow of the FIFO is prevented, so that the stable processing can be achieved.

Note that while the problem of the buffer overflow in the reception buffer of the aggregation processing node 1 that receives the integration communication packet is described in the above description, the present embodiment provides a distributed processing method that dissolves a bottleneck for not only the reception buffer but also all parts to be the bottleneck in packet processing by hardware, for example various parts such as an internal bus of a PCIe (PCI Express) and a FIFO, a memory and DMA (Direct Memory Access) transfer or the like loaded on a packet processing circuit.

Second Embodiment

Figure 14:
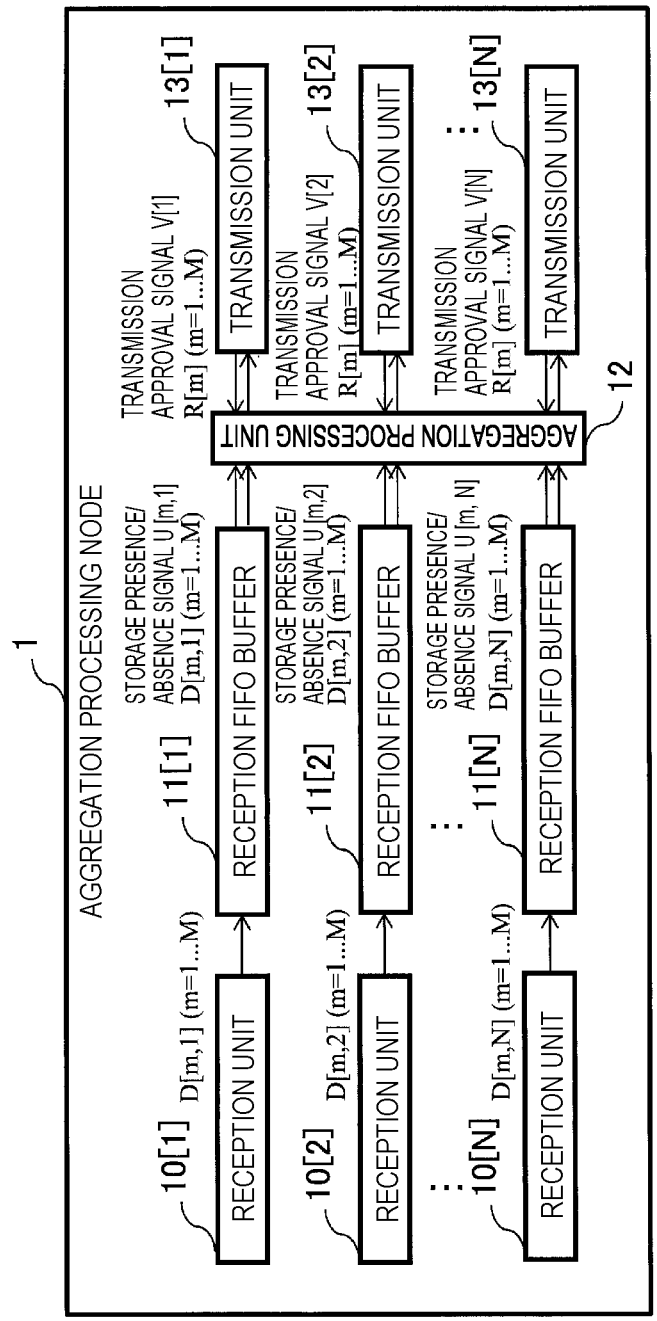
FIG. 14 is a block diagram illustrating a configuration example of the aggregation processing node according to a second embodiment of the present invention.

Next, the second embodiment of the present invention will be described. The present embodiment describes a configuration example of the aggregation processing node 1 which is a component of the distributed processing system for the deep learning in the first embodiment. FIG. 14 is a block diagram illustrating the configuration example of the aggregation processing node 1.

The aggregation processing node 1 includes reception units 10[n] (n=1, ..., N), reception FIFO (First In, First Out) buffers 11[n], an aggregation processing unit 12, and transmission units 13[n].

As described in the first embodiment, in the integration communication processing, the aggregation processing node 1 receives M pieces of the distributed data D[m, n] (m=1, ..., M) as Pg integration communication packets SP[p, n] (p=1, ..., Pg) among which the distributed data is divided by every Lg pieces, from each of the distributed processing nodes 2[n] (n=1, ..., N). In the integration communication packet SP[p, n] (p=1, ..., Pg), Lg pieces of the distributed data D[i, n] (i=Lg×(p−1)+1, l=1, ..., Lg) are stored.

In addition, in the distribution communication processing, the aggregation processing node 1 divides M pieces of the aggregation data R[m] (m=1, ..., M) into Ls pieces each and transmits the aggregation data as Ps integration communication packets DP[p, n] (p=1, ..., Ps), to each of the distributed processing nodes 2[n] (n=1, ..., N).

As illustrated in FIG. 14, the aggregation processing node 1 includes the reception units 10[n] for receiving the integration communication packet SP[p, n] from each distributed processing node 2[n] (n=1, ..., N), for each distributed processing node 2[n].

Each reception unit 10[n] performs the integration communication processing described in FIG. 5. Specifically, each reception unit 10[n] receives the integration communication packet SP[p, n] transmitted by the corresponding distributed processing node 2[n], acquires Lg pieces of the distributed data D[i, n] (i=Lg((p−1)+1, l=1, ..., Lg) stored in the order of the number m of the weight w[m] in the integration communication packet SP[p, n] in the order of a number i (i is a part of the number m of the weight w[m]), and delivers the data to the reception FIFO buffer 11[n] of a subsequent stage.

In addition, as illustrated in FIG. 14, the aggregation processing node 1 includes the reception FIFO buffers 11[n] for each reception unit 10[n] (each distributed processing node 2[n]). Further, the aggregation processing node 1 includes the aggregation processing unit 12 that reads the distributed data D[m, n] of the number m (m=1, ..., M) stored in each reception FIFO buffer 11[n] (n=1, ..., N) from each reception FIFO buffer 11[n] and aggregates the data. The reception FIFO buffer 11[n] and the aggregation processing unit 12 perform the entire node aggregation processing described in FIG. 6.

Specifically, the reception FIFO buffer 11[n] stores Lg pieces of the distributed data D[i, n] (i=Lg((p−1)+1, l=1, ..., Lg) delivered from the corresponding reception unit 10[n], in the order of the number i (i is a part of the number m). The storage is started from a state where each reception FIFO buffer 11[n] is empty. When the reception of the integration communication packet SP[p, n] and the storage of the distributed data D[i, n] are performed for Pg times, M pieces of the distributed data D[m, n] are stored in each reception FIFO buffer 11[n].

Therefore, when the same number of pieces each of the distributed data stored in each reception FIFO buffer 11[n] are read, the distributed data D[m, n] read from each reception FIFO buffer 11[n] is arranged in the order of m=1, ..., M.

Each reception FIFO buffer 11[n] (n=1, ..., N) outputs a storage presence/absence signal U[n] indicating presence/absence of the storage of the distributed data respectively to the aggregation processing unit 12.

When all the storage presence/absence signals U[n] (n=1, ..., N) indicate storage presence of the distributed data, the aggregation processing unit 12 reads the distributed data piece by piece from each reception FIFO buffer 11[n]. Note that each reception FIFO buffer 11[n] stores the distributed data in the order of the number m, and the aggregation processing unit 12 reads the same number of pieces of the distributed data from each reception FIFO buffer 11[n]. Therefore, the number m of the distributed data read from each reception FIFO buffer 11[n] is the same value among the individual reception FIFO buffers 11[n]. Thus, the storage presence/absence signal U[n] does not need to specify the number m of the distributed data and may just notify whether or not the distributed data to be read next is stored in each reception FIFO buffer 11[n].

However, as described later, while the aggregation data R[m] generated based on the read distributed data D[m, n] is stored in the distribution communication packet in the aggregation processing unit 12 and is transmitted from each transmission unit 13[n] (n=1, ..., N), in the case of not being in the state of transmitting the distribution communication packet (in the case of being in the middle of transmitting a different distribution communication packet for example), the aggregation processing unit 12 holds read of the next distributed data D[m, n] until it becomes possible to transmit the distribution communication packet.

Therefore, when it becomes possible to transmit the distribution communication packet, each transmission unit 13[n] (n=1, ..., N) outputs a transmission approval signal V[n] which indicates that the distribution communication packet can be transmitted to the aggregation processing unit 12.

The aggregation processing unit 12 receives the storage presence/absence signal U[n] from each reception FIFO buffer 11[n] (n=1, ..., N) and the transmission approval signal V[n] (n=1, ..., N) from each transmission unit 13[n] (n=1, ..., N), and determines whether or not to read the distributed data from each reception FIFO buffer 11[n].

Specifically, the aggregation processing unit 12 reads the distributed data D[m, n] from each reception FIFO buffer 11[n], when the storage presence/absence signal U[n] indicates the storage presence of the distributed data D[m, n] to be read next and the transmission approval signal V[n] indicates that it is possible to transmit the distribution communication packet including the aggregation data R[m] generated from the read distributed data D[m, n].

Further, the aggregation processing unit 12 generates the aggregation data R[m] in the order of the number m based on the distributed data D[m, n] (m=1, ..., N) read in the order of the number m from each reception FIFO buffer 11[n], and delivers the aggregation data R[m] in the order of the number m to the transmission unit 13[n] of the subsequent stage. Here, the same aggregation data is delivered to each transmission unit 13[n]. A calculation formula of the aggregation data R[m] is as indicated in Formula (2).

The transmission unit 13[n] for transmitting the distribution communication packet to each distributed processing node 2[n] (n=1, ..., N) is provided for each distributed processing node 2[n]. The transmission unit 13[n] performs the distribution communication processing described in FIG. 7.

Each transmission unit 13[n] divides the aggregation data R[m] (m=1, ..., M) delivered in the order of the number m from the aggregation processing unit 12 among Ps distribution communication packets by every Ls pieces of data and transmits the data. That is, in the distribution communication packet DP [p, n] transmitted in a p-th order (p=1, ..., Ps) to the distributed processing node 2[n], Ls pieces of the aggregation data R[j] (j=Ls×(p−1)+k, k=1, ..., Ls) are stored. As described above, each transmission unit 13[n] outputs the transmission approval signal V[n] to the aggregation processing unit 12 when it becomes possible to transmit the distribution communication packet DP [p, n].

As described in the first embodiment, under the condition where M cannot be divided by Ls, each transmission unit 13[n] stores (M−Ls×(Ps−1)) pieces of the aggregation data R[j] (j=Ls×(Ps−1)+o, o=1, ..., M−Ls×(Ps−1)) in the Ps-th distribution communication packet DP[Ps, n]. In addition, for the Ps-th distribution communication packet DP[Ps, n], each transmission unit 13[n] may add {Ls−(M−Ls×(Ps−1))} dummy numerical values after (M−Ls×(Ps−1)) pieces of the aggregation data R[j] such that all the distribution communication packets equally store Ls pieces of data.

As described above, each reception unit 10[n] (n=1, ..., N) takes out the distributed data D[m, n] in the order of the number m (m=1, ..., M) of the weight w[m] from the integration communication packet received from the distributed processing node 2[n], and stores the distributed data in the reception FIFO buffer 11[n] for each distributed processing node in the order of the number m.

The aggregation processing unit 12 reads the distributed data D[m, n] from each reception FIFO buffer 11[n] in the order of the number m, and generates the aggregation data R[m] based on the read distributed data D[m, n]. Further, each transmission unit 13[n] stores the generated aggregation data R[m] in the distribution communication packet in the order of the number m, and transmits the distribution communication packet to each distributed processing node 2[n].

Figure 15:
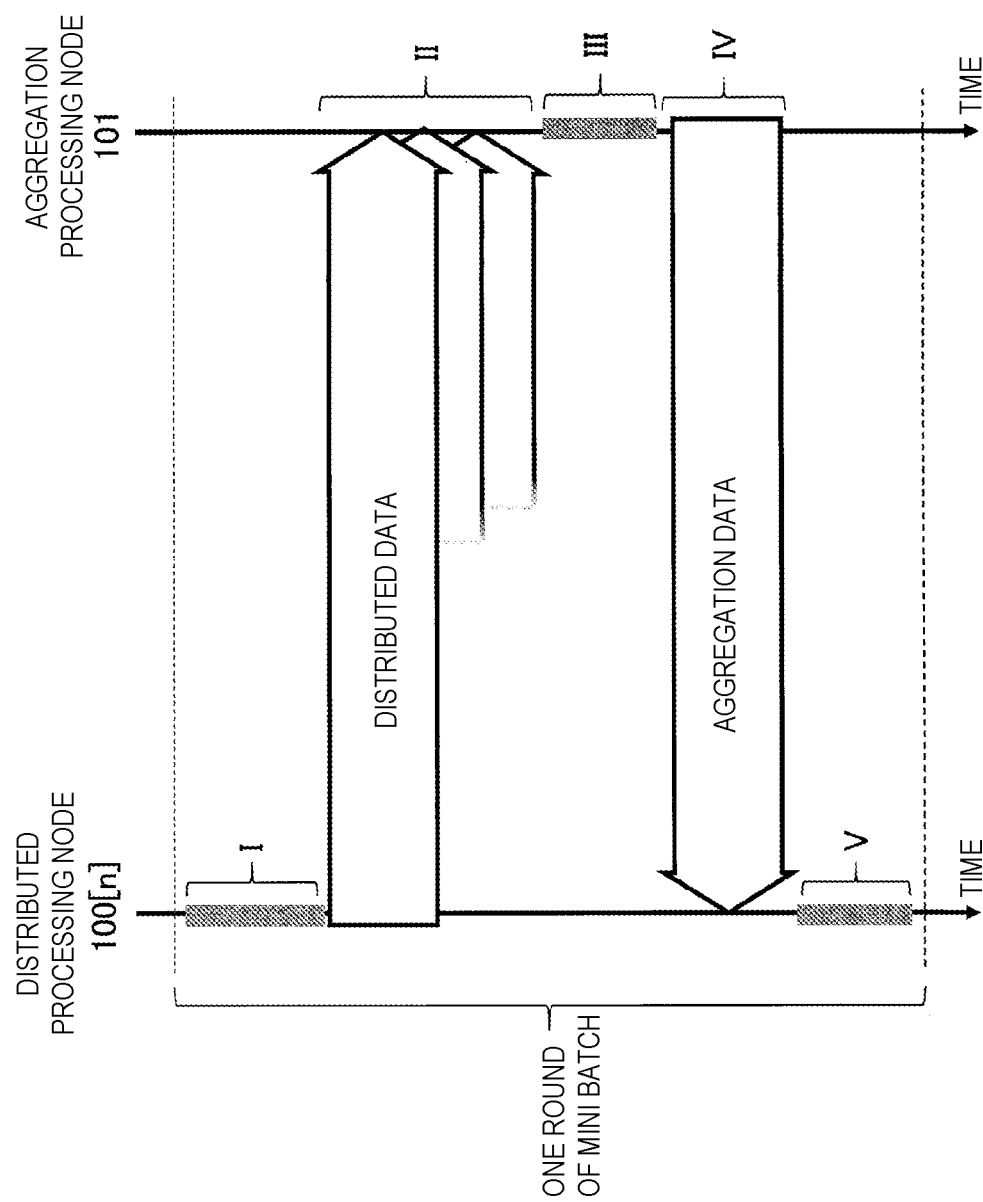
FIG. 15 is a diagram illustrating a sequence of distributed processing of conventional deep learning.
Figure 16:
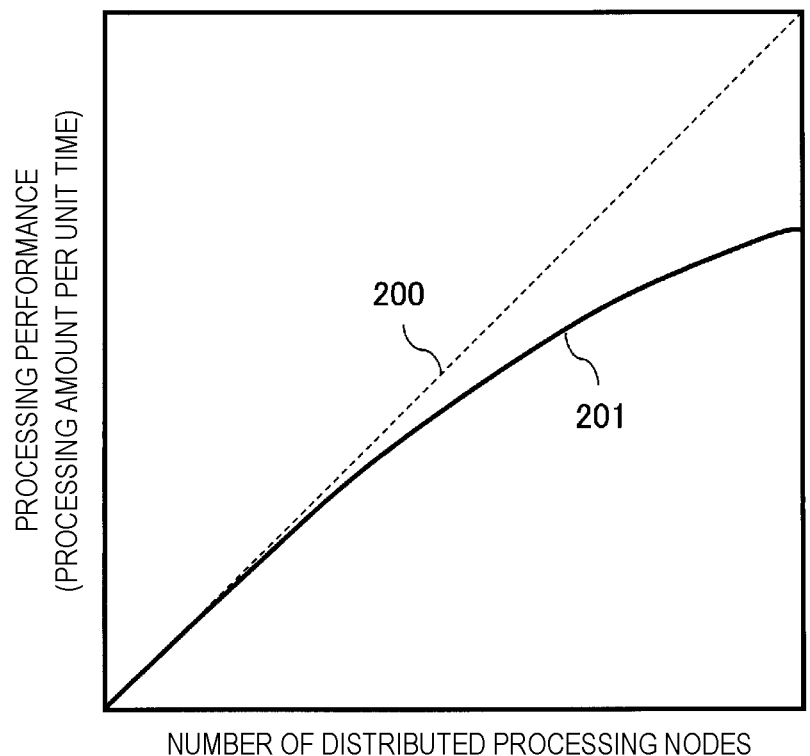
FIG. 16 is a diagram illustrating a relation between the number of distributed processing nodes and a processing performance of the deep learning in a conventional distributed processing system.

In the conventional technology described in FIG. 15, an aggregation processing node 101 receives all the distributed data D[m, n] (m=1, ..., M) from distributed processing nodes 100[n], then generates all the aggregation data R[m] (m=1, ..., M) by aggregating the distributed data D[m, n], and thereafter returns the aggregation data R[m] to the distributed processing nodes 100[n].

In contrast, in the present embodiment, since the integration communication processing, the entire node aggregation processing and the distribution communication processing in the aggregation processing node 1 can be pipelined for the mutually different number m, the time from the reception of the distributed data D[m, n] from each distributed processing node 2[n] until return of the aggregation data R[m] for which the distributed data D[m, n] is aggregated for all the nodes to each distributed processing node 2[n] can be substantially shortened compared to the conventional technology.

For example, when the time required for each processing regarding the number m is defined as t, the time from the reception of the distributed data D[m, n] from each distributed processing node 2[n] until the return of the aggregation data R[m] for which the distributed data D[m, n] is aggregated for all the distributed processing nodes 2[n] to each distributed processing node 2[n] is 4t (the number of stages of the pipeline=4) in embodiments of the present invention.

On the other hand, in the conventional technology, since M-fold time is required for each processing, the time from the reception of the distributed data D[m, n] from each distributed processing node 100[n] until the return of the aggregation data R[m] to each distributed processing node 100[n] is 4t×M. In such a manner, in the present embodiment, the time can be shortened to 1/M (M is the number of the weight w[m] and can be a value around 100,000,000).

Since the other components of the distributed processing system are the same as the components described in the first embodiment, the description is omitted in the present embodiment.

In addition, as described in the first embodiment, each distributed processing node 2[n] monitors the unreceived data amount Md, stops the transmission of the integration communication packet to be transmitted to the aggregation processing node 1 when the unreceived data amount Md is equal to or larger than the transmission stop threshold Ma, and restarts the transmission when the unreceived data amount Md is equal to or smaller than the transmission restart threshold Mb after the transmission stop.

In such transmission control, since the thresholds Ma and Mb can be determined such that the number of frames stored in the reception FIFO buffer 11[n] in the aggregation processing node 1 does not exceed a buffer size, so-called frame loss can be prevented, and a stable operation can be achieved. In addition, since it is not needed to increase the size of the reception FIFO buffer 11[n] more than necessary, it is contributory to adjustment of a circuit scale by optimization of a memory.

The aggregation processing node 1 and each of the distributed processing nodes 2[n] described in the first and second embodiments can be achieved by a computer including a CPU (Central Processing Unit), a storage device and an interface, and a program that controls the hardware resources. The CPU of the aggregation processing node 1 and each of the distributed processing nodes 2[n] executes the processing described in the first and second embodiments according to the program stored in each storage device.

INDUSTRIAL APPLICABILITY

Embodiments of the present invention are applicable to technology of performing machine learning of a neural network.

REFERENCE SIGNS LIST

1 Aggregation processing node
2 Distributed processing node
3 Network
10 Reception unit
11 Reception FIFO buffer
12 Aggregation processing unit
13 Transmission unit
20 Sample input unit
21 Gradient calculation processing unit
22 Intra-node aggregation processing unit
23 Transmission unit
24 Reception unit
25 Weight updating processing unit
26 Neural network
27 Transmission count unit 28 Reception count unit
29 Transmission control unit

The invention claimed is:

1. A distributed processing system comprising:
an aggregation processing node; and
N distributed processing nodes, wherein N is an integer equal to or larger than 2, wherein each distributed processing node is configured to:
  packetize distributed data D[m, n] (n=1, ..., N) for each of M weights w[m] (m=1, ..., M) of a neural network of a learning object, wherein M is an integer equal to or larger than 2, in an order of a number m of the weight w[m];
  transmit the data to the aggregation processing node;
  receive a packet transmitted from the aggregation processing node;
  acquire aggregation data R[m] in the order of the number m; and
  update the weight w[m] of the neural network based on the aggregation data R[m];
wherein the aggregation processing node is configured to:
  receive a packet transmitted from each distributed processing node;
  acquire the distributed data D[m, n] in the order of the number m;
  generate the aggregation data R[m] for which the distributed data D[m, n] of all the distributed processing nodes is aggregated for each weight w[m];
  packetize the aggregation data R[m] in the order of the number m; and
  transmit the data to each distributed processing node; and
wherein each distributed processing node is configured to monitor an unreceived data amount which is a difference between a data amount of transmitted distributed data D[m, n] and a data amount of acquired aggregation data R[m] in a period from start of transmission of the distributed data D[m, n] to the aggregation processing node until end of acquisition of M pieces of the aggregation data R[m], and when the unreceived data amount becomes equal to or larger than a threshold Ma, stop the transmission of the distributed data D[m, n] until the unreceived data amount becomes equal to or smaller than a threshold Mb (Mb<Ma).

2. The distributed processing system according to claim 1, wherein each distributed processing node comprises:
  a transmitter configured to packetize the distributed data D[m, n] in the order of the number m and transmit the data to the aggregation processing node;
  a receiver configured to receive a packet transmitted from the aggregation processing node and acquire the aggregation data R[m] in the order of the number m;
  a weight updating processor configured to update the weight w[m] of the neural network based on the aggregation data R[m];
  a transmission counter configured to count a number Mt of pieces of the transmitted distributed data D[m, n] in the period from the start of the transmission of the distributed data D[m, n] to the aggregation processing node until the end of the acquisition of M pieces of the aggregation data R[m], wherein Mt is a positive integer equal to or smaller than M;
  a reception counter configured to count a number Mr of pieces of the acquired aggregation data R[m] in the period from the start of the transmission of the distributed data D[m, n] to the aggregation processing node until the end of the acquisition of M pieces of the aggregation data R[m], wherein Mr is a positive integer equal to or smaller than M; and
  a transmission controller configured to, when the unreceived data amount which is a difference between the numbers Mt and Mr becomes equal to or larger than the threshold Ma, where Ma is a positive integer smaller than M, stop the transmission of the distributed data D[m, n] by the transmitter until the unreceived data amount becomes equal to or smaller than the threshold Mb, where Mb is a positive integer smaller than Ma.

3. The distributed processing system according to claim 1, wherein the aggregation processing node comprises:
  a receiver configured to receive the packet transmitted from each distributed processing node and acquire the distributed data D[m, n] in the order of the number m;
  an aggregation processor configured to generate the aggregation data R[m] for which the distributed data D[m, n] of all the distributed processing nodes is aggregated for each weight w[m]; and
  a transmitter configured to packetize the aggregation data R[m] in the order of the number m and transmit the data to each distributed processing node.

4. The distributed processing system according to claim 1, wherein each distributed processing node further comprises:
  a gradient calculation processor configured to, when sample data for learning of the neural network is inputted, calculate a gradient of a loss function of the neural network for each piece of the sample data, for each of the weights w[m] of the neural network; and
  an intra-node aggregation processor configured to generate and hold the distributed data D[m, n] that is a numerical value for which the gradient for each piece of sample data is aggregated, for each weight w[m].

5. The distributed processing system according to claim 1, wherein the aggregation processing node and each distributed processing node are configured to:
  perform integration communication processing in which each distributed processing node is configured to transmit the packetized distributed data D[m, n] to the aggregation processing node and the aggregation processing node is configured to acquire the distributed data D[m, n] from the received packet;
  perform entire node aggregation processing in which the aggregation processing node is configured to generate the aggregation data R[m];
  perform distribution communication processing in which the aggregation processing node is configured to transmit the packetized aggregation data R[m] to each distributed processing node and each distributed processing node is configured to acquire the aggregation data R[m] from the received packet; and
  perform weight updating processing in which each distributed processing node is configured to update the weight w[m], in parallel for the respectively different numbers m.

6. A distributed processing method, comprising:
  a first step in which each of N distributed processing nodes, wherein N is an integer equal to or larger than 2, packetizes distributed data D[m, n] (n=1, ..., N) for each of M weights w[m] (m=1, ..., M) of a neural network of a learning object, wherein M is an integer equal or to larger than 2, in an order of a number m of the weight w[m], and transmits the data to an aggregation processing node;
  a second step in which the aggregation processing node receives a packet transmitted from each distributed processing node, and acquires the distributed data D[m, n] in the order of the number m;

a third step in which the aggregation processing node generates aggregation data R[m] for which the distributed data D[m, n] of all the distributed processing nodes is aggregated for each weight w[m];

a fourth step in which the aggregation processing node packetizes the aggregation data R[m] in the order of the number m, and transmits the data to each distributed processing node;

a fifth step in which each of the distributed processing nodes receives a packet transmitted from the aggregation processing node, and acquires the aggregation data R[m] in the order of the number m;

a sixth step in which each of the distributed processing nodes updates the weight w[m] of the neural network based on the aggregation data R[m]; and a seventh step in which each of the distributed processing nodes monitors an unreceived data amount which is a difference between a data amount of transmitted distributed data D[m, n] and a data amount of acquired aggregation data R[m] in a period from start of transmission of the distributed data D[m, n] to the aggregation processing node until end of acquisition of M pieces of the aggregation data R[m], and when the unreceived data amount becomes equal to or larger than a threshold Ma, stops the transmission of the distributed data D [m, n] by the first step until the unreceived data amount becomes equal to or smaller than a threshold Mb (Mb<Ma).

7. The distributed processing method according to claim 6, further comprising:

an eighth step in which, when sample data for learning of the neural network is inputted, each of the distributed processing nodes calculates a gradient of a loss function of the neural network for each piece of the sample data, for each of the weights w[m] of the neural network, before the first step; and a ninth step in which each of the distributed processing nodes generates and holds the distributed data D[m, n] that is a numerical value for which the gradient for each piece of sample data is aggregated, for each weight w[m].

8. The distributed processing method according to claim 6, wherein the first step of the distributed processing node and the second step of the aggregation processing node, the third step of the aggregation processing node, the fourth step of the aggregation processing node and the fifth step of the distributed processing node, and the sixth step of the distributed processing node are performed in parallel for the respectively different numbers m.

9. A distributed processing system comprising:

at least two distributed processing nodes wherein each distributed processing node comprises:

a first transmitter configured to packetize distributed data D[m, n] (n=1, . . . , N) for each of M weights w[m] (m=1, . . . , M) of a neural network of a learning object, wherein M is an integer equal to or larger than 2, in an order of a number m of the weight w[m] to an aggregation processing node;

a first receiver configured to receive a packet transmitted from the aggregation processing node and acquire aggregation data R[m] in the order of the number m;

a weight updating processor configured to update the weight w[m] of the neural network based on the aggregation data R[m];

a transmission counter configured to count a number Mt of pieces of the transmitted distributed data D[m, n] in a period from a start of transmission of the distributed data D[m, n] to the aggregation processing node until an end of acquisition of M pieces of the aggregation data R[m], wherein Mt is a positive integer equal to or smaller than M;

a reception counter configured to count a number Mr of pieces of the acquired aggregation data R[m] in the period from the start of the transmission of the distributed data D[m, n] to the aggregation processing node until the end of the acquisition of M pieces of the aggregation data R[m], wherein Mr is a positive integer equal to or smaller than M; and a transmission controller configured to, when the unreceived data amount which is a difference between the numbers Mt and Mr becomes equal to or larger than a threshold Ma, where Ma is a positive integer smaller than M, stop the transmission of the distributed data D[m, n] by the transmitter until the unreceived data amount becomes equal to or smaller than a threshold Mb, where Mb is a positive integer smaller than Ma; and the aggregation processing node comprising:

a second receiver configured to receive a packet transmitted from each distributed processing node and acquire the distributed data D[m, n] in the order of the number m;

an aggregation processor configured to generate the aggregation data R[m] for which the distributed data D[m, n] of all the distributed processing nodes is aggregated for each weight w[m]; and a second transmitter configured to packetize the aggregation data R[m] in the order of the number m and transmit the data to each distributed processing node.

10. The distributed processing system according to claim 9, wherein the aggregation processing node and each distributed processing node are configured to:

perform integration communication processing in which each distributed processing node is configured to transmit the packetized distributed data D[m, n] to the aggregation processing node and the aggregation processing node is configured to acquire the distributed data D[m, n] from the received packet;

perform entire node aggregation processing in which the aggregation processing node is configured to generate the aggregation data R[m];

perform distribution communication processing in which the aggregation processing node is configured to transmit the packetized aggregation data R[m] to each distributed processing node and each distributed processing node is configured to acquire the aggregation data R[m] from the received packet; and perform weight updating processing in which each distributed processing node is configured to update the weight w[m], in parallel for the respectively different numbers m.

* * * * *